(12) United States Patent
Kim et al.

(10) Patent No.: US 12,695,906 B2
(45) Date of Patent: *Jul. 28, 2026

(54) VIDEO SIGNAL PROCESSING METHOD AND DEVICE USING BLOCK DPCM PREDICTION METHOD

(71) Applicant: WILUS INSTITUTE OF STANDARDS AND TECHNOLOGY INC., Seongnam-si (KR)

(72) Inventors: Dongcheol Kim, Suwon-si (KR); Geonjung Ko, Seoul (KR); Jaehong Jung, Seoul (KR); Juhyung Son, Uiwang-si (KR); Jinsam Kwak, Uiwang-si (KR)

(73) Assignee: WILUS INSTITUTE OF STANDARDS AND TECHNOLOGY INC., Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/732,485

(22) Filed: Jun. 3, 2024

(65) Prior Publication Data

US 2024/0323432 A1 Sep. 26, 2024

Related U.S. Application Data

(63) Continuation of application No. 17/596,501, filed as application No. PCT/KR2020/007530 on Jun. 10, 2020, now Pat. No. 12,047,601.

(30) Foreign Application Priority Data

Jun. 11, 2019 (KR) ........................ 10-2019-0068630

(51) Int. Cl.
H04N 7/12 (2006.01)
H04N 19/12 (2014.01)
(Continued)

(52) U.S. Cl.
CPC ........... *H04N 19/593* (2014.11); *H04N 19/12* (2014.11); *H04N 19/176* (2014.11); *H04N 19/61* (2014.11)

(58) Field of Classification Search
CPC .... H04N 19/593; H04N 19/12; H04N 19/176; H04N 19/61; H04N 19/11; H04N 19/70; H04N 19/119; H04N 19/132
See application file for complete search history.

(56) References Cited

U.S. PATENT DOCUMENTS 9,380,303 B1 6/2016 Eslami
10,244,260 B2 3/2019 Kalevo et al.
(Continued)

FOREIGN PATENT DOCUMENTS

CN 105493507 A 4/2016
JP 2022-534238 A 7/2022
(Continued)

OTHER PUBLICATIONS

Notice of Allowance for JP 2023-166011 by Japan Patent Office dated Jul. 29, 2024.
(Continued)

*Primary Examiner* — Gims S Philippe
(74) *Attorney, Agent, or Firm* — BROADVIEW IP LAW, PC

(57) ABSTRACT

The present disclosure relates to a method and device for processing a video signal and, more specifically, comprises the steps of: parsing, from a bitstream, block-based delta pulse code modulation (BDPCM) enable information indicating whether or not BDPCM has been enabled; when the BDPCM enable information indicates that the BDPCM has been enabled, the width of a current block is less than or equal to a first value, and the height of the current block is less than or equal to a second value, parsing, from the
(Continued)

100 bitstream, intra BDPCM information indicating whether or not the BDPCM is to be applied to the current block; when the intra BDPCM information indicates that the BDPCM is to be applied to the current block, parsing, from the bitstream, intra BDPCM direction information regarding the current block; and reconstructing the current block on the basis of the intra BDPCM direction information.

18 Claims, 14 Drawing Sheets

(51) Int. Cl.

| | |
|---|---|
| *H04N 19/176* | (2014.01) |
| *H04N 19/593* | (2014.01) |
| *H04N 19/61* | (2014.01) |

(56) References Cited

U.S. PATENT DOCUMENTS

| | | | | |
|---|---|---|---|---|
| 11,870,996 | B2 * | 1/2024 | Zhu | H04N 19/122 |
| 11,930,176 | B2 * | 3/2024 | Zhang | H04N 19/186 |
| 2014/0362917 | A1 * | 12/2014 | Joshi | H04N 19/44 |
| | | | | 375/240.12 |
| 2015/0063454 | A1 | 3/2015 | Guo et al. | |
| 2016/0156933 | A1 | 6/2016 | Kalevo et al. | |
| 2020/0296390 | A1 | 9/2020 | Chao et al. | |
| 2022/0038698 | A1 | 2/2022 | Koo et al. | |
| 2022/0150542 | A1 * | 5/2022 | Yoo | H04N 11/046 |
| 2022/0248034 | A1 | 8/2022 | Yoo et al. | |
| 2022/0256160 | A1 | 8/2022 | Yoo et al. | |

FOREIGN PATENT DOCUMENTS

| | | | |
|---|---|---|---|
| KR | 10-2011-0032331 | A | 3/2011 |
| KR | 10-2014-0137505 | A | 12/2014 |
| WO | 2015/031499 | A1 | 3/2015 |
| WO | 2018/173798 | A1 | 9/2018 |
| WO | 2020/139774 | A1 | 7/2020 |
| WO | 2020/218793 | A1 | 10/2020 |
| WO | 2020/223467 | A1 | 11/2020 |
| WO | 2020/235961 | A1 | 11/2020 |
| WO | 2020/256390 | A1 | 12/2020 |

OTHER PUBLICATIONS

Clare, Gordon et al. "CE8: BDPCM with harmonized residual coding and CCB limitation (CE8-3.1a, CE8-3.1b, CE8-5.1a, CE8-5.1b)," Joint Video Experts Team (JVET) of ITU-T SG 16 WP 3 and ISO/IEC JTC 1/SC 29/WG 11. JVET-N0214. Mar. 2019.

Bross, Benjamin et al. "Versatile Video Coding (Draft 5)," Joint Video Experts Team (JVET) of ITU-T SG 16 WP 3 and ISO/IEC JTC 1/SC 29/WG 11. JVET-N1001-v8. Mar. 2019.

Yoo, Sunmi et al. "CE8-related : Unified condition between BDPCM and transform skip," Joint Video Experts Team (JVET) of ITU-T SG 16 WP 3 and ISO/IEC JTC 1/SC 29/WG 11. JVET-O0206_v1. Jul. 2019.

Extended European Search Report for EP20822036 by European Patent Office dated Jun. 30, 2022.

Non-Final Office Action for IN202127058758 by Intellectual Property India dated Jun. 1, 2022.

Karczewicz (Qualcomm) M et al: "CE8-related: Quantized residual BDPCM", 14. JVET Meeting; Mar. 19, 2019-Mar. 27, 2019; Geneva; (The Joint Video Exploration Team of ISO/IEC JTC1/SC29/WG11 and ITU-T SG. 16), No. JVET-N0413 Mar. 24, 2019 (Mar. 24, 2019), XP030204779, Retrieved from the Internet: URL:http://phenix.int-evry.fr/jvet/doc_end_user/documents/14_Geneva/wg11/JVET-N0413-v4.zip JVET-N0413_r3.docx [retrieved on Mar. 24, 2019].

Janle Chen et al: "Algorithm description for Versatile Video Coding and Test Model 5 (VTM 5)", 14. JVET Meeting; Mar. 19, 2019-Mar.

27, 2019; Geneva; (The Joint Video Exploration Team of ISO/IEC JTC1/SC29/WG11 and ITU-T SG. 16), No. JVET-N1002-v1; JVET-N1002 May 21, 2019 (May 21, 2019), pp. 1-70, XP030205194, Retrieved from the Internet: URL: http://phenix.int-evry.fr/jvet/doc_end_user/documents/14_Geneva/wg11/JVET-N1002-v1.zip JVET-N1002-v1.docx [retrieved on May 21, 2019].

Henry (Orange) F et al: "CE8-related: SPS flag for BDPCM", 15. JVET Meeting; Jul. 3, 2019-Jul. 12, 2019; Gothenburg; (The Joint Video Exploration Team of ISO/IEC JTC1/SC29/WG11 and ITU-T SG.16), No. JVET-O0165; m48258 Jun. 25, 2019 (Jun. 25, 2019), XP030218745, Retrieved from the Internet: URL: http://phenix.int-evry.fr/jvet/doc_end_user/documents/15_Gothenburg/wg11/JVET-O0165-v1.zip JVET-O0165/JVET-00165.docx [retrieved on Jun. 25, 2019].

Xu (Hikvision) L et al.: "CE8-related:SPS level flags for BDPCM and JCCR", 15. JVET Meeting; Jul. 3, 2019-Jul. 12, 2019; Gothenburg; (The Joint Video Exploration Team of ISO/IEC JTC1/SC29/WG11 and ITU-T SG.16), No. JVET-O0376; m48495 Jul. 10, 2019 (Jul. 10, 2019), XP030219389, Retrieved from the Internet: URL: http://phenix.int-evry.fr/jvet/doc_end_user/documents/15_Gothenburg/wg11/JVET-O0376-v6.zip JVET-O0376/JVET-O0376-v2.docx [retrieved on Jul. 10, 2019].

Chen L et al: "AHG17: Control of transform skip residual coding", 15. JVET Meeting; Jul. 3, 2019-Jul. 12, 2019; Gothenburg; (The Joint Video Exploration Team of ISO/IEC JTC1/SC29/WG11 and ITU-T SG.16) No. JVET-O0783 Jul. 3, 2019 (Jul. 3, 2019), XP030220362, Retrieved from the Internet: URL:http://phenix.int-evry.fr/jvet/doc_end_user/documents/15_Gothenburg/wg11/JVET-O0783-v2.zip JVET-O0783-v2-clean.docx [retrieved on Jul. 3, 2019].

Bross B et al: "Versatile Video Coding(Draft 5)", 14. JVET Meeting; Mar. 19, 2019-Mar. 27, 2019; Geneva; (The Joint Video Exploration Team of ISO/IEC JTC1/SC29/WG11 and ITU-TSG. 16), No. JVET-N1001 May 29, 2019 (May 29, 2019), pp. 1-383, XP030205196, Retrieved from the Internet: URL:http://phenix.int-evry.fr/jvet/doc_end_user/documents/14_Geneva/wg11/JVET-N1001-v7.zip JVET-N1001-v7.docx [retrieved on May 29, 2019].

Anonymous: "Algorithm description for Versatile Video Coding and Test Model 5 (VTM 5)", ITU-T Standard, Recommendation, Feb. 1, 2018 (Feb. 1, 2018) pp. 1-672, XP055701552, CH Retrieved from the Internet: URL: https://www.itu.int/rec/T-REC-H.265-201802-S/en.

Versatile Video Coding (Draft 5), JVET-N1001-v7, May 29, 2019.

International Search Report & Written Opinion of the International Searching Authority dated Sep. 17, 2020.

Office Action for JP 2024-146707 by Japan Patent Office dated May 20, 2025.

Office Action for KR 10-2021-7040470 by Korean Intellectual Property Office dated Jun. 30, 2025.

Office Action for KR 10-2021-7040470 by Korean Intellectual Property Office dated Nov. 8, 2024.

Office Action for CN 202080043005.6 by China National Intellectual Property Administration dated Nov. 11, 2024.

Non-Final Rejection for U.S. Appl. No. 17/596,501 by United States Patent and Trademark Office dated Oct. 11, 2023.

Notice of Allowance for U.S. Appl. No. 17/596,501 by United States Patent and Trademark Office dated Mar. 19, 2024.

Notice of Reasons for Rejection for JP2021-573573 by Japan Patent Office dated Feb. 13, 2023.

Kang, Jewon et al., Non-RCE3: Explicit signaling of intra RDPCM, Joint Collaborative Team on Video Coding (JCT-VC) of ITU-T SG 16 WP 3 and ISO/IEC JTC 1/SC 29/WG 11 15th Meeting: Geneva, CH, Oct. 23-Nov. 1, 2013, [JCTVC-O0178_r2], JCTVC-O0178 (version 3), ITU-T, Oct. 24, 2013, <URL:http://phenix.it-sudparis.eu/jct/doc_end_user/documents/15_Geneva/wg11/JCTVC-O0178-v3.zip>: JCTVC-O0178_r2.docx.doc: pp. 1-7.

Notice of Allowance for JP 2024-146707 by Japan Patent Office dated Sep. 16, 2025.

Clare, Gordon et al., "CE8-related: SPS flag for BDPCM," Joint Video Experts Team (JVET) of ITU-T SG 16 WP 3 and ISO/IEC JTC 1/SC 29/WG 11. Jul. 2019. doc: JVET-O0165.

Xu, Liying et al., "CE8-related: A SPS Level Flags For BDPCM and JCCR," Joint Video Experts Team (JVET) of ITU-T SG 16 WP 3 and ISO/IEC JTC 1/SC 29/WG 11. Jul. 2019. doc: JVET-O0376-v2.

(56)                      References Cited

OTHER PUBLICATIONS

Chen, Lulin et al., "AHG17: adding control of the transform skip coding," Joint Video Experts Team (JVET) of ITU-T SG 16 WP 3 and ISO/IEC JTC 1/SC 29/WG 11. Jul. 2019. doc: JVET-O0783-v3.

Extended European Search Report for EP 25194805.5 by European Patent Office dated Jan. 13, 2026.

Office Action for JP 2025-174836 by Japan Patent Office dated Jun. 9, 2026.

* cited by examiner

200

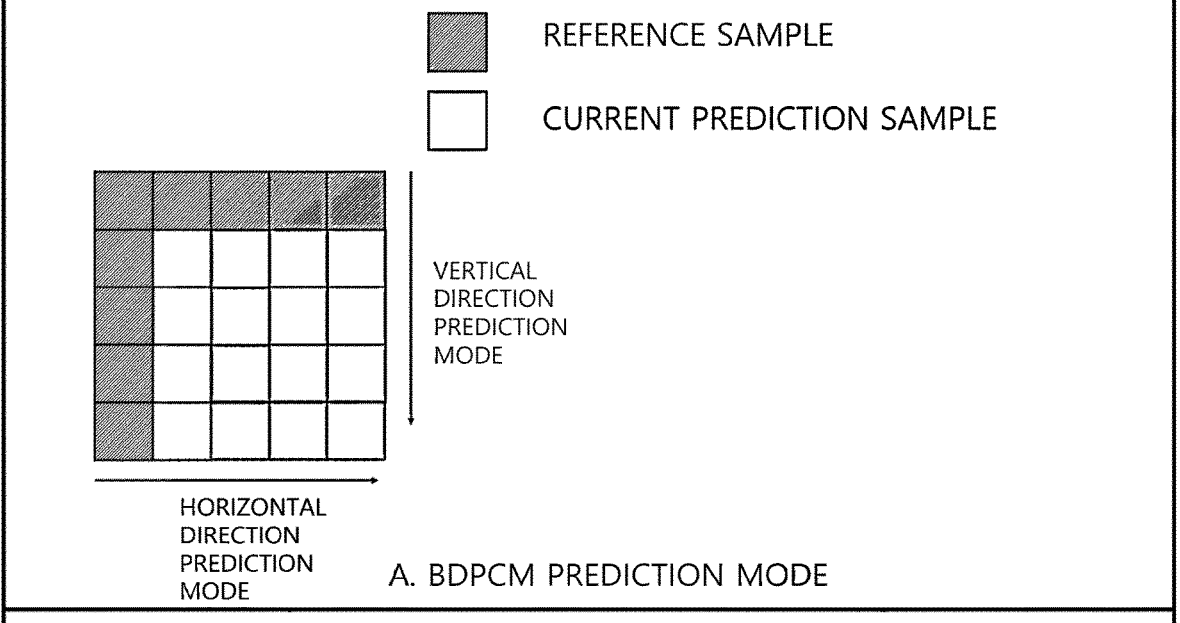

REFERENCE SAMPLE

CURRENT PREDICTION SAMPLE

VERTICAL
DIRECTION
PREDICTION
MODE

HORIZONTAL
DIRECTION
PREDICTION
MODE

A. BDPCM PREDICTION MODE

When vertical BDPCM is signalled:

$$\tilde{r}_{i,j} = \begin{cases} Q(r_{i,j}), & i = 0, \quad 0 \leq j \leq (N-1) \\ Q(r_{i,j}) - Q(r_{(i-1),j}), & 1 \leq i \leq (M-1), \quad 0 \leq j \leq (N-1) \end{cases}$$

For horizontal prediction, similar rules apply, and the residual quantized samples are obtained by $$\tilde{r}_{i,j} = \begin{cases} Q(r_{i,j}), & 0 \leq i \leq (M-1), \quad j = 0 \\ Q(r_{i,j}) - Q(r_{i,(j-1)}), & 0 \leq i \leq (M-1), \quad 1 \leq j \leq (N-1) \end{cases}$$

B. QUANTIZED RESIDUAL SAMPLES OF BDPCM

FIG. 8

Sequence parameter set RBSP syntax

| seq_parameter_set_rbsp() { | Descript or |
| --- | --- |
| sps_decoding_parameter_set_id | u(4) |
| sps_video_parameter_set_id | u(4) |
| sps_max_sub_layers_minus1 | u(3) |
| sps_reserved_zero_5bits | u(5) |
| ... | |
| | |
| sps_bdpcm_enabled_flag | u(1) |
| sps_isp_enabled_flag | u(1) |
| sps_mrl_enabled_flag | u(1) |
| sps_mip_enabled_flag | u(1) |
| sps_cclm_enabled_flag | u(1) |
| ... | |
| } | |

FIG. 9

Coding Unit  Syntax

| coding_unit( x0, y0, cbWidth, cbHeight, treeType ) { | Descriptor |
|---|---|
| if( slice_type != I \|\| sps_ibc_enabled_flag ) { | |
| if( treeType != DUAL_TREE_CHROMA && <br> !( cbWidth = = 4 && cbHeight = = 4  && !sps_ibc_enabled_flag ) ) | |
| cu_skip_flag[ x0 ][ y0 ] | ae(v) |
| if( cu_skip_flag[ x0 ][ y0 ] = = 0  && slice_type != I <br> && !( cbWidth = = 4 && cbHeight = = 4 ) ) | |
| pred_mode_flag | ae(v) |
| if( ( ( slice_type = = I  && cu_skip_flag[ x0 ][ y0 ] = =0 ) \|\| <br> ( slice_type != I  && ( CuPredMode[ x0 ][ y0 ] != MODE_INTRA \|\| <br> ( cbWidth = = 4  && cbHeight = = 4  && cu_skip_flag[ x0 ][ y0 ] = = 0 ) ) ) ) && <br> sps_ibc_enabled_flag && ( cbWidth != 128 \|\| cbHeight != 128 ) ) | |
| pred_mode_ibc_flag | ae(v) |
| } | |
| if( CuPredMode[ x0 ][ y0 ]  = =  MODE_INTRA ) { | |
| if( sps_pcm_enabled_flag && <br> cbWidth >= MinIpcmCbSizeY  && cbWidth <= MaxIpcmCbSizeY && <br> cbHeight >= MinIpcmCbSizeY  && cbHeight <= MaxIpcmCbSizeY ) | |
| pcm_flag[ x0 ][ y0 ] | ae(v) |
| | |
| if( pcm_flag[ x0 ][ y0 ] ) { | |
| while( !byte_aligned( ) ) | |
| pcm_alignment_zero_bit | f(1) |
| pcm_sample( cbWidth, cbHeight, treeType) | |
| } else { | |
| if( treeType = = SINGLE_TREE \|\| treeType = = DUAL_TREE_LUMA ) { | |
| if( sps_bdpcm_enabled_flag && cb Width <= 32  && cbHeight <= 32 ) | |
| intra_bdpcm_flag[ x0 ][ y0 ] | ae(v) |
| if( intra_bdpcm_flag[ x0 ][ y0 ] ) | |
| intra_bdpcm_dir_flag [ x0 ][ y0 ] | ae(v) |
| else { | |
| if( sps_mip_enabled_flag && <br> ( Abs( Log2( cbWidth ) − Log2( cbHeight ) ) <= 2 ) && <br> cbWidth <= MaxTbSizeY  && cbHeight <= MaxTbSizeY ) | |
| intra_mip_flag[ x0 ][ y0 ] | ae(v) |

FIG. 10

Coding Unit  Syntax

| coding_unit( x0, y0, cbWidth, cbHeight, treeType ) { | Descriptor |
|---|---|
| if( slice_type != I \|\| sps_ibc_enabled_flag ) { | |
| if( treeType != DUAL_TREE_CHROMA && <br> !( cbWidth = = 4 && cbHeight = = 4  &&  !sps_ibc_enabled_flag ) ) | |
| cu_skip_flag[ x0 ][ y0 ] | ae(v) |
| if( cu_skip_flag[ x0 ][ y0 ] = = 0  &&  slice_type  != I <br> && !( cbWidth = = 4 && cbHeight = = 4 ) ) | |
| pred_mode_flag | ae(v) |
| if( ( ( slice_type = = I  &&  cu_skip_flag[ x0 ][ y0 ] = =0 )  \|\| <br> ( slice_type != I  &&  ( CuPredMode[ x0 ][ y0 ] != MODE_INTRA  \|\| <br> ( cbWidth = = 4  &&  cbHeight = = 4  && cu_skip_flag[ x0 ][ y0 ] = = 0 ) ) ) ) && <br> sps_ibc_enabled_flag  &&  ( cbWidth != 128  \|\|  cbHeight != 128 ) ) | |
| pred_mode_ibc_flag | ae(v) |
| } | |
| if( CuPredMode[ x0 ][ y0 ]  = =  MODE_INTRA ) { | |
| if( sps_pcm_enabled_flag && <br> cbWidth >= MinIpcmCbSizeY  &&  cbWidth <= MaxIpcmCbSizeY && <br> cbHeight >= MinIpcmCbSizeY  &&  cbHeight <= MaxIpcmCbSizeY ) | |
| pcm_flag[ x0 ][ y0 ] | ae(v) |
| | |
| if( pcm_flag[ x0 ][ y0 ] ) { | |
| while( !byte_aligned( ) ) | |
| pcm_alignment_zero_bit | f(1) |
| pcm_sample( cbWidth, cbHeight, treeType) | |
| } else { | |
| if( treeType = = SINGLE_TREE  \|\|  treeType = = DUAL_TREE_LUMA ) { | |
| if(cb Width <= Value1  &&  cbHeight <= Value2 ) | - |
| intra_bdpcm_flag[ x0 ][ y0 ] | ae(v) |
| if( intra_bdpcm_flag[ x0 ][ y0 ] ) | - |
| intra_bdpcm_dir_flag [ x0 ][ y0 ] | ae(v) |
| else { | - |
| if( sps_mip_enabled_flag && <br> ( Abs( Log2( cbWidth ) − Log2( cbHeight ) ) <= 2 ) && <br> cbWidth <= MaxTbSizeY  &&  cbHeight <= MaxTbSizeY ) | |
| intra_mip_flag[ x0 ][ y0 ] | ae(v) |

Transform unit syntax

| transform_unit( x0, y0, tbWidth, tbHeight, treeType, subTuIndex ) { | Descriptor |
|---|---|
| if( ( treeType == SINGLE_TREE || treeType == DUAL_TREE_CHROMA ) { | - |
| if( ( IntraSubPartitionsSplitType == ISP_NO_SPLIT && !( cu_sbt_flag && | - |
| ( ( subTuIndex == 0 && cu_sbt_pos_flag ) || | |
| ( subTuIndex == 1 && !cu_sbt_pos_flag ) ) ) ) || | |
| ( IntraSubPartitionsSplitType != ISP_NO_SPLIT && | |
| ( subTuIndex == NumIntraSubPartitions − 1 ) ) ) { | |
| tu_cbf_cb[ x0 ][ y0 ] | ae(v) |
| tu_cbf_cr[ x0 ][ y0 ] | ae(v) |
| } | - |
| } | - |
| if( treeType == SINGLE_TREE || treeType == DUAL_TREE_LUMA ) { | |
| if( ( IntraSubPartitionsSplitType == ISP_NO_SPLIT && !( cu_sbt_flag && | |
| ( ( subTuIndex == 0 && cu_sbt_pos_flag ) || | |
| ( subTuIndex == 1 && !cu_sbt_pos_flag ) ) ) && | |
| ( CuPredMode[ x0 ][ y0 ] != MODE_INTRA || | |
| tu_cbf_cb[ x0 ][ y0 ] || tu_cbf_cb[ x0 ][ y0 ] ) ) || | |
| ( IntraSubPartitionsSplitType != ISP_NO_SPLIT && | |
| ( subTuIndex < NumIntraSubPartitions − 1 || !InferTuCbfLuma ) ) ) | |
| tu_cbf_luma[ x0 ][ y0 ] | ae(v) |
| if (IntraSubPartitionsSplitType != ISP_NO_SPLIT ) | |
| InferTuCbfLuma = InferTuCbfLuma && !tu_cbf_luma[ x0 ][ y0 ] | |
| } | |
| if( IntraSubPartitionsSplitType != ISP_NO_SPLIT && | |
| treeType == SINGLE_TREE && subTuIndex == NumIntraSubPartitions − 1 ) ) | |
| xC = CbPosX[ x0 ][ y0 ] | |
| yC = CbPosY[ x0 ][ y0 ] | |
| wC = CbWidth[ x0 ][ y0 ] / 2 | |
| hC = CbHeight[ x0 ][ y0 ] / 2 | |
| } else | |
| xC = x0 | |
| yC = y0 | |
| wC = tbWidth / SubWidthC | |
| hC = tbHeight / SubHeightC | |
| } | |
| if( ( tu_cbf_luma[ x0 ][ y0 ] || tu_cbf_cb[ x0 ][ y0 ] || tu_cbf_cr[ x0 ][ y0 ] ) && | |
| treeType != DUAL_TREE_CHROMA ) { | |
| if( cu_qp_delta_enabled_flag && !IsCuQpDeltaCoded ) { | |
| cu_qp_delta_abs | ae(v) |
| if( cu_qp_delta_abs ) | |
| cu_qp_delta_sign_flag | ae(v) |
| } | |
| } | |
| if( tu_cbf_luma[ x0 ][ y0 ] && treeType != DUAL_TREE_CHROMA | |
| && ( tbWidth <= 32 ) && ( tbHeight <= 32 ) | |
| && ( IntraSubPartitionsSplit[ x0 ][ y0 ] == ISP_NO_SPLIT ) && ( !cu_sbt_flag ) | |
| && ( ! intra_bdpcm_flag[x0][y0]) ) { | |
| if( transform_skip_enabled_flag && tbWidth <= MaxTsSize && tbHeight <= MaxTsSize ) | |
| transform_skip_flag[ x0 ][ y0 ] | ae(v) |
| if( ( ( CuPredMode[ x0 ][ y0 ] != MODE_INTRA && sps_explicit_mts_inter_enabled_flag ) | |
| || ( CuPredMode[ x0 ][ y0 ] == MODE_INTRA && sps_explicit_mts_intra_enabled_flag )) | |
| && ( !transform_skip_flag[ x0 ][ y0 ] ) ) | |
| tu_mts_idx[ x0 ][ y0 ] | ae(v) |
| } | |
| if( tu_cbf_luma[ x0 ][ y0 ] ) { | |
| if( !transform_skip_flag[ x0 ][ y0 ] ) | - |
| residual_coding( x0, y0, Log2( tbWidth ), Log2( tbHeight ), 0 ) | - |
| else | - |
| residual_ts_coding( x0, y0, Log2( tbWidth ), Log2( tbHeight ), 0 ) | - |
| } | |

FIG. 12

Transform unit syntax

| | Descriptor |
|---|---|
| transform_unit( x0, y0, tbWidth, tbHeight, treeType, subTuIndex ) { | |
| if( ( treeType == SINGLE_TREE \|\| treeType == DUAL_TREE_CHROMA ) { | - |
| if( ( IntraSubPartitionsSplitType == ISP_NO_SPLIT && !( cu_sbt_flag && | |
| ( ( subTuIndex == 0 && cu_sbt_pos_flag ) \|\| | |
| ( subTuIndex == 1 && !cu_sbt_pos_flag ) ) ) ) \|\| | |
| ( IntraSubPartitionsSplitType != ISP_NO_SPLIT && | |
| ( subTuIndex == NumIntraSubPartitions − 1 ) ) ) { | |
| tu_cbf_cb[ x0 ][ y0 ] | ae(v) |
| tu_cbf_cr[ x0 ][ y0 ] | ae(v) |
| } | |
| } | - |
| } | - |
| if( treeType == SINGLE_TREE \|\| treeType == DUAL_TREE_LUMA ) { | |
| if( ( IntraSubPartitionsSplitType == ISP_NO_SPLIT && !( cu_sbt_flag && | |
| ( ( subTuIndex == 0 && cu_sbt_pos_flag ) \|\| | |
| ( subTuIndex == 1 && !cu_sbt_pos_flag ) ) ) && | |
| ( CuPredMode[ x0 ][ y0 ] != MODE_INTRA \|\| | |
| tu_cbf_cb[ x0 ][ y0 ] \|\| tu_cbf_cb[ x0 ][ y0 ] ) ) \|\| | |
| ( IntraSubPartitionsSplitType != ISP_NO_SPLIT && | |
| ( subTuIndex < NumIntraSubPartitions − 1 \|\| !InferTuCbfLuma ) ) ) | |
| tu_cbf_luma[ x0 ][ y0 ] | ae(v) |
| if (IntraSubPartitionsSplitType != ISP_NO_SPLIT ) | |
| InferTuCbfLuma = InferTuCbfLuma && !tu_cbf_luma[ x0 ][ y0 ] | |
| } | |
| if( IntraSubPartitionsSplitType != ISP_NO_SPLIT && | |
| treeType == SINGLE_TREE && subTuIndex == NumIntraSubPartitions − 1 ) ) | |
| xC = CbPosX[ x0 ][ y0 ] | |
| yC = CbPosY[ x0 ][ y0 ] | |
| wC = CbWidth[ x0 ][ y0 ] / 2 | |
| hC = CbHeight[ x0 ][ y0 ] / 2 | |
| } else | |
| xC = x0 | |
| yC = y0 | |
| wC = tbWidth / SubWidthC | |
| hC = tbHeight / SubHeightC | |
| } | |
| if( ( tu_cbf_luma[ x0 ][ y0 ] \|\| tu_cbf_cb[ x0 ][ y0 ] \|\| tu_cbf_cr[ x0 ][ y0 ] ) && | |
| treeType != DUAL_TREE_CHROMA ) { | |
| if( cu_qp_delta_enabled_flag && !IsCuQpDeltaCoded ) { | |
| cu_qp_delta_abs | ae(v) |
| if( cu_qp_delta_abs ) | |
| cu_qp_delta_sign_flag | ae(v) |
| } | |
| } | |
| if( tu_cbf_luma[ x0 ][ y0 ] && treeType != DUAL_TREE_CHROMA | |
| && ( tbWidth <= 32 ) && ( tbHeight <= 32 ) | |
| && ( IntraSubPartitionsSplit[ x0 ][ y0 ] == ISP_NO_SPLIT ) && ( !cu_sbt_flag ) ) { | |
| if( transform_skip_enabled_flag && tbWidth <= MaxTsSize && tbHeight <= MaxTsSize | |
| && (! intra_bdpcm_flag[x0][y0]) ) | |
| transform_skip_flag[ x0 ][ y0 ] | ae(v) |
| if( (( CuPredMode[ x0 ][ y0 ] != MODE_INTRA && sps_explicit_mts_inter_enabled_flag ) | |
| \|\| ( CuPredMode[ x0 ][ y0 ] == MODE_INTRA && sps_explicit_mts_intra_enabled_flag )) | |
| && ( !transform_skip_flag[ x0 ][ y0 ] ) ) | |
| tu_mts_idx[ x0 ][ y0 ] | ae(v) |
| } | |
| if( tu_cbf_luma[ x0 ][ y0 ] ) { | |
| if( !transform_skip_flag[ x0 ][ y0 ] ) | - |
| residual_coding( x0, y0, Log2( tbWidth ), Log2( tbHeight ), 0 ) | |
| else | - |
| residual_ts_coding( x0, y0, Log2( tbWidth ), Log2( tbHeight ), 0 ) | - |
| } | - |

IntraPredModeY[ xCb ][ yCb ]

REFERENCE SAMPLE

CURRENT PREDICTION SAMPLE

VERTICAL
DIRECTION
PREDICTION MODE

HORIZONTAL
DIRECTION
PREDICTION MODE

Fig.12. BDPCM PREDICTION
MODE

VIDEO SIGNAL PROCESSING METHOD AND DEVICE USING BLOCK DPCM PREDICTION METHOD

CROSS-REFERENCE TO RELATED APPLICATIONS

This application is a continuation application of U.S. patent application Ser. No. 17/596,501, filed on Dec. 10, 2021, which is the U.S. National Stage filing under 35 U.S.C. 371 of PCT International Application No. PCT/KR2020/007530, which was filed on Jun. 10, 2020, and which claims priority under 35 U.S.C 119(a) to Korean Patent Application No. 10-2019-0068630 filed with the Korean Intellectual Property Office on Jun. 11, 2019. The disclosures of the above patent applications are incorporated herein by reference in their entirety.

TECHNICAL FIELD

The present disclosure relates to a method and device for processing a video signal, and more particularly, to a method and device for processing a video signal for encoding or decoding the video signal.

BACKGROUND ART

Compression coding refers to a series of signal processing techniques for transmitting digitized information through a communication line or storing information in a form suitable for a storage medium. An object of compression encoding includes objects such as voice, video, and text, and in particular, a technique for performing compression encoding on an image is referred to as video compression. Compression coding for a video signal is performed by removing excess information in consideration of spatial correlation, temporal correlation, and stochastic correlation. However, with the recent development of various media and data transmission media, a more efficient video signal processing method and apparatus are required.

DISCLOSURE OF THE INVENTION

Technical Problem

An object of the present disclosure is to increase coding efficiency of the video signal.

Technical Solution

A method for processing a video signal according to an embodiment of the present disclosure includes the steps of parsing block-based delta pulse code modulation (BDPCM) enable information indicating whether BDPCM is enabled from a bitstream, when the BDPCM enable information indicates that the BDPCM is enabled, a width of a current block is less than or equal to a first value and a height of the current block is less than or equal to a second value, parsing intra BDPCM information indicating whether the BDPCM is applied to the current block from the bitstream, when the intra BDPCM information indicates that the BDPCM is applied to the current block, parsing intra BDPCM direction information related to the current block, and reconstructing the current block based on the intra BDPCM direction information.

In the method for processing the video signal according to the embodiment of the present disclosure, the first value and the second value are each a maximum block size that allows transform skip.

In the method for processing the video signal according to the embodiment of the present disclosure, the intra BDPCM information and the intra BDPCM direction information are parsed for a luma component regardless of a chroma component.

In the method for processing the video signal according to the embodiment of the present disclosure, the BDPCM enable information is signaled as a sequence.

In the method for processing the video signal according to the embodiment of the present disclosure, when the intra BDPCM information indicates that the BDPCM is applied to the current block, transform skip information of a transform block corresponding to the current block is not parsed from the bitstream, and the transform skip information indicates that transform is not applied to a block corresponding to the transform skip information when a value of the transform skip information is a first inference value.

The method for processing the video signal according to the embodiment of the present disclosure further includes the steps of, when the transform skip information does not exist and the intra BDPCM information indicates that the BDPCM is applied to the current block, inferring the transform skip information as the first inference value, and, when the transform skip information does not exist and the intra BDPCM information indicates that the BDPCM is not applied to the current block, inferring the transform skip information as a second inference value.

In the method for processing the video signal according to the embodiment of the present disclosure, the intra BDPCM direction information indicates one of a horizontal direction or a vertical direction.

The method for processing the video signal according to the embodiment of the present disclosure further includes the steps of, when the intra BDPCM direction information is 0, selecting an intra prediction mode corresponding to the horizontal direction among a plurality of intra modes as an intra prediction mode of the current block, and, when the intra BDPCM direction information is 1, selecting an intra prediction mode corresponding to the vertical direction among the plurality of intra modes as the intra prediction mode of the current block.

In the method for processing the video signal according to the embodiment of the present disclosure, the intra prediction mode of the current block is used to determine an intra prediction mode of a neighboring block to be reconstructed after the current block.

A device for processing a video signal according to an embodiment of the present disclosure includes a processor and a memory, in which the processor, based on instructions stored in the memory, parses block-based delta pulse code modulation (BDPCM) enable information indicating whether BDPCM is enabled from a bitstream, when the BDPCM enable information indicates that the BDPCM is enabled, a width of a current block is less than or equal to a first value, and a height of the current block is less than or equal to a second value, parses intra BDPCM information indicating whether the BDPCM is applied to the current block from the bitstream, when the intra BDPCM information indicates that the BDPCM is applied to the current block, parses intra BDPCM direction information related to the current block from the bitstream, and reconstructs the current block based on the intra BDPCM direction information.

In the device for processing the video signal according to the embodiment of the present disclosure, the first value and the second value are each a maximum block size that allows transform skip.

In the device for processing the video signal according to the embodiment of the present disclosure, the intra BDPCM information and the intra BDPCM direction information are parsed for a luma component regardless of a chroma component.

In the device for processing the video signal according to the embodiment of the present disclosure, the BDPCM enable information may be signaled as a sequence.

In the device for processing the video signal according to the embodiment of the present disclosure, when the intra BDPCM information indicates that the BDPCM is applied to the current block, transform skip information of a transform block corresponding to the current block is not parsed from the bitstream, and the transform skip information indicates that transform is not applied to a block corresponding to the transform skip information when a value of the transform skip information is a first inference value.

In the device for processing the video signal according to the embodiment of the present disclosure, the processor, based on instructions stored in the memory, when the transform skip information does not exist and the intra BDPCM information indicates that the BDPCM is applied to the current block, infers the transform skip information as the first inference value, and the processor, based on instructions stored in the memory, when the transform skip information does not exist and the intra BDPCM information indicates that the BDPCM is not applied to the current block, infers the transform skip information as a second inference value.

In the device for processing the video signal according to the embodiment of the present disclosure, the intra BDPCM direction information indicates one of a horizontal direction or a vertical direction.

In the device for processing the video signal according to the embodiment of the present disclosure, the processor, based on instructions stored in the memory, when the intra BDPCM direction information is 0, selects an intra prediction mode corresponding to the horizontal direction among a plurality of intra modes as an intra prediction mode of the current block, and the processor, based on instructions stored in the memory, when the intra BDPCM direction information is 1, selects an intra prediction mode corresponding to the vertical direction among the plurality of intra modes as the intra prediction mode of the current block.

In the device for processing the video signal according to the embodiment of the present disclosure, the intra prediction mode of the current block is used to determine an intra prediction mode of a neighboring block to be reconstructed after the current block.

A method for processing a video signal according to an embodiment of the present disclosure includes the steps of generating block-based delta pulse code modulation (BDPCM) enable information indicating whether BDPCM is enabled, when the BDPCM enable information indicates that the BDPCM is enabled, a width of a current block is less than or equal to a first value, and a height of the current block is less than or equal to a second value, generating intra BDPCM information indicating whether the BDPCM is applied to the current block, when the intra BDPCM information indicates that the BDPCM is applied to the current block, generating intra BDPCM direction information related to the current block, and generating a bitstream based on the BDPCM enable information, the intra BDPCM information, and the intra BDPCM direction information.

In the method for processing the video signal according to the embodiment of the present disclosure, when the intra BDPCM information indicates that BDPCM is applied to the current block, transform skip information of a transform block corresponding to the current block is not generated.

A device for processing a video signal according to an embodiment of the present disclosure includes a processor and a memory, in which the processor, based on instructions stored in the memory, generates block-based delta pulse code modulation (BDPCM) enable information indicating whether BDPCM is enabled, when the BDPCM enable information indicates that the BDPCM is enabled, a width of a current block is less than or equal to a first value, and a height of the current block is less than or equal to a second value, generates intra BDPCM information indicating whether the BDPCM is applied to the current block, when the intra BDPCM information indicates that the BDPCM is to be applied to the current block, generates intra BDPCM direction information related to the current block, and generates a bitstream based on the BDPCM enable information, the intra BDPCM information, and the intra BDPCM direction information.

In the device for processing the video signal according to the embodiment of the present disclosure, when the intra BDPCM information indicates that the BDPCM is applied to the current block, transform skip information of a transform block corresponding to the current block is not generated.

A computer-readable recording medium having an encoded video signal recorded therein according to an embodiment of the present disclosure includes the steps of generating block-based delta pulse code modulation (BDPCM) enable information indicating whether BDPCM is enabled, when the BDPCM enable information indicates that the BDPCM is enabled, a width of a current block is less than or equal to a first value, and a height of the current block is less than or equal to a second value, generating intra BDPCM information indicating whether or not the BDPCM is applied to the current block, when the intra BDPCM information indicates that the BDPCM is applied to the current block, generating intra BDPCM direction information related to the current block, and generating a bitstream based on the BDPCM enable information, the intra BDPCM information, and the intra BDPCM direction information.

Advantageous Effects

According to an embodiment of the present disclosure, coding efficiency of a video signal can be increased.

BRIEF DESCRIPTION OF THE DRAWINGS

FIG. 8 is a diagram illustrating a prediction mode and a quantized residual signal of block DPCM (BDPCM).

FIG. 9 is a diagram illustrating a BDPCM flag defined in a sequence parameter set.

FIG. 10 is a diagram illustrating a part of a coding unit syntax structure.

FIG. 11 is a diagram illustrating a part of coding unit syntax and includes a size variable of a block to which BDPCM is applied.

FIG. 12 is a diagram illustrating a part of a transform unit syntax.

FIG. 13 is a diagram illustrating signaling/parsing conditions of a transform skip flag within a part of the transform unit syntax.

MODE FOR CARRYING OUT THE INVENTION

Terms used in this specification may be currently widely used general terms in consideration of functions in the present invention but may vary according to the intents of those skilled in the art, customs, or the advent of new technology. Additionally, in certain cases, there may be terms the applicant selects arbitrarily and in this case, their meanings are described in a corresponding description part of the present invention. Accordingly, terms used in this specification should be interpreted based on the substantial meanings of the terms and contents over the whole specification.

In this specification, some terms may be interpreted as follows. Coding may be interpreted as encoding or decoding in some cases. In the present specification, an apparatus for generating a video signal bitstream by performing encoding (coding) of a video signal is referred to as an encoding apparatus or an encoder, and an apparatus that performs decoding (decoding) of a video signal bitstream to reconstruct a video signal is referred to as a decoding apparatus or decoder. In addition, in this specification, the video signal processing apparatus is used as a term of a concept including both an encoder and a decoder. Information is a term including all values, parameters, coefficients, elements, etc. In some cases, the meaning is interpreted differently, so the present invention is not limited thereto. A 'unit' is used to mean a basic unit of image processing or a specific position of a picture, and refers to an image region including both a luma component and a chroma component. In addition, a 'block' refers to an image region including a specific component among the luma component and the chroma component (i.e., Cb and Cr). However, terms such as 'unit', 'block', 'partition', and 'region' may be used interchangeably depending on the embodiment. In addition, in the present specification, the unit or block can be used as a concept including both a coding unit (or a coding block), a prediction unit (or a prediction block), and a transform unit (or a transform block). The picture indicates a field or a frame, and the terms may be used interchangeably depending on the embodiment.

Figure 1:
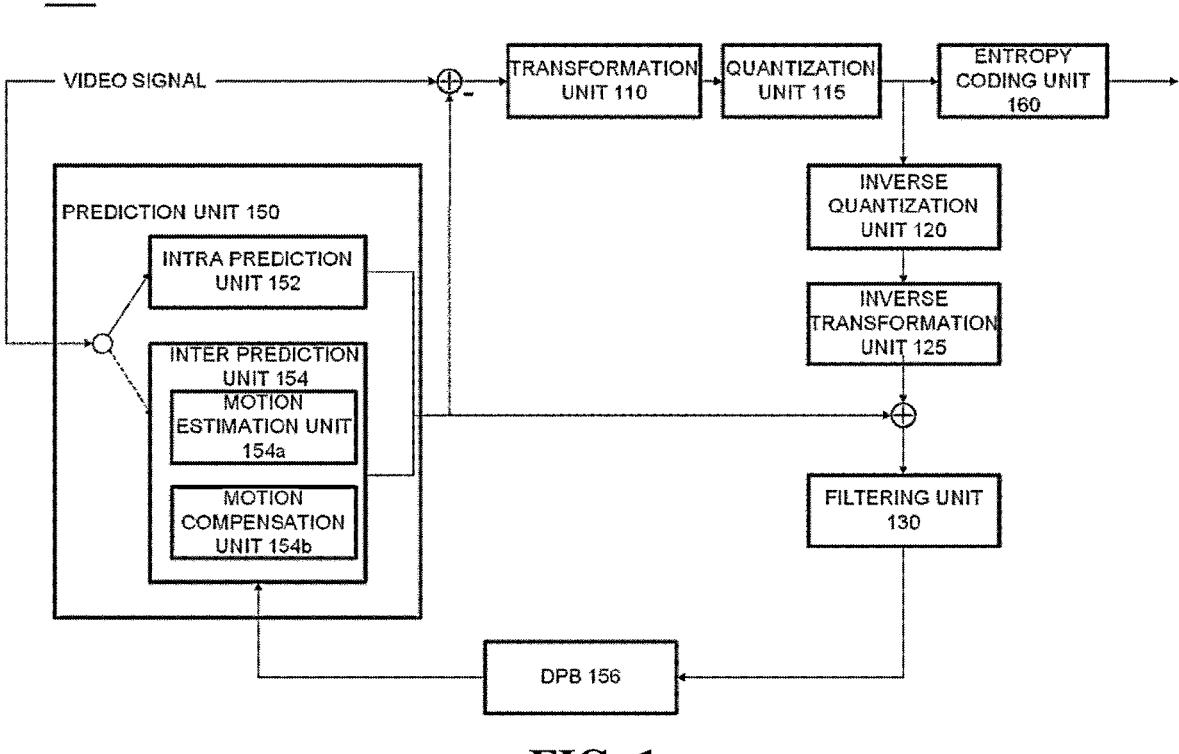
FIG. 1 is a schematic block diagram of a video signal encoding apparatus according to an embodiment of the present invention.

FIG. 1 is a schematic block diagram of a video signal encoding apparatus according to an embodiment of the present invention. Referring to FIG. 1, the encoding apparatus 100 of the present invention includes a transformation unit 110, a quantization unit 115, an inverse quantization unit 120, an inverse transformation unit 125, a filtering unit 130, a prediction unit 150, and an entropy coding unit 160.

The transformation unit 110 obtains a value of a transform coefficient by transforming a residual signal, which is a difference between the inputted video signal and the predicted signal generated by the prediction unit 150. For example, a Discrete Cosine Transform (DCT), a Discrete Sine Transform (DST), or a Wavelet Transform can be used. The DCT and DST perform transformation by splitting the input picture signal into blocks. In the transformation, coding efficiency may vary according to the distribution and characteristics of values in the transformation region. The quantization unit 115 quantizes the value of the transform coefficient value outputted from the transformation unit 110.

In order to improve coding efficiency, instead of coding the picture signal as it is, a method of predicting a picture using a region already coded through the prediction unit 150 and obtaining a reconstructed picture by adding a residual value between the original picture and the predicted picture to the predicted picture is used. In order to prevent mismatches in the encoder and decoder, information that can be used in the decoder should be used when performing prediction in the encoder. For this, the encoder performs a process of reconstructing the encoded current block again. The inverse quantization unit 120 inverse-quantizes the value of the transform coefficient, and the inverse transformation unit 125 reconstructs the residual value using the inverse quantized transform coefficient value. Meanwhile, the filtering unit 130 performs filtering operations to improve the quality of the reconstructed picture and to improve the coding efficiency. For example, a deblocking filter, a sample adaptive offset (SAO), and an adaptive loop filter may be included. The filtered picture is outputted or stored in a decoded picture buffer (DPB) 156 for use as a reference picture.

The prediction unit 150 includes an intra prediction unit 152 and an inter prediction unit 154. The intra prediction unit 152 performs intra prediction in the current picture, and the inter prediction unit 154 performs inter prediction to predict the current picture by using the reference picture stored in the DBP 156. The intra prediction unit 152 performs intra prediction from reconstructed samples in the current picture, and transfers intra encoding information to the entropy coding unit 160. The intra encoding information may include at least one of an intra prediction mode, a most probable mode (MPM) flag, and an MPM index. The inter prediction unit 154 may include the motion estimation unit 154*a* and the motion compensation unit 154*b*. The motion estimation unit 154*a* obtains a motion vector value of the current region by referring to a specific region of the reconstructed reference picture. The motion estimation unit 154*a* transfers a motion information set (reference picture index, motion vector information, etc.) for the reference region to the entropy coding unit 160. The motion compensation unit 154*b* performs motion compensation by using the motion vector value transferred from the motion estimation unit 154*a*. The inter prediction unit 154 transfers inter encoding information including motion information on the reference region to the entropy coding unit 160.

When the picture prediction described above is performed, the transformation unit 110 transforms a residual value between the original picture and the predicted picture to obtain a transform coefficient value. In this case, the transformation may be performed in a specific block unit within a picture, and the size of a specific block may be varied within a preset range. The quantization unit 115 quantizes the transform coefficient value generated in the transformation unit 110 and transmits it to the entropy coding unit 160.

The entropy coding unit 160 performs entropy coding on the quantized transform coefficient, inter coding information, intra coding information, and the like to generate the video signal bitstream. In the entropy coding unit 160, a variable length coding (VLC) scheme, an arithmetic coding scheme, etc. may be used. The variable length coding (VLC) scheme includes transforming input symbols into consecutive codewords, and a length of a codeword may be variable. For example, frequently occurring symbols are represented by a short codeword, and infrequently occurring symbols are represented by a long codeword. A context-based adaptive variable length coding (CAVLC) scheme may be used as a variable length coding scheme. Arithmetic coding may transform continuous data symbols into a single prime number, wherein arithmetic coding may obtain an optimal bit required for representing each symbol. A context-based adaptive binary arithmetic code (CABAC) may be used as arithmetic coding.

The generated bitstream is encapsulated using a network abstraction layer (NAL) unit as a basic unit. The NAL unit includes an integer number of coded coding tree units. In order to decode a bitstream in a video decoder, first, the bitstream must be separated in NAL units, and then each separated NAL unit must be decoded. Meanwhile, information necessary for decoding a video signal bitstream may be transmitted through an upper level set of Raw Byte Sequence Payload (RBSP) such as Picture Parameter Set (PPS), Sequence Parameter Set (SPS), Video Parameter Set (VPS), and the like.

Meanwhile, the block diagram of FIG. 1 shows an encoding apparatus 100 according to an embodiment of the present invention, and separately displayed blocks logically distinguish and show the elements of the encoding apparatus 100. Accordingly, the elements of the above-described encoding apparatus 100 may be mounted as one chip or as a plurality of chips depending on the design of the device. According to an embodiment, the operation of each element of the above-described encoding apparatus 100 may be performed by a processor (not shown).

Figure 2:
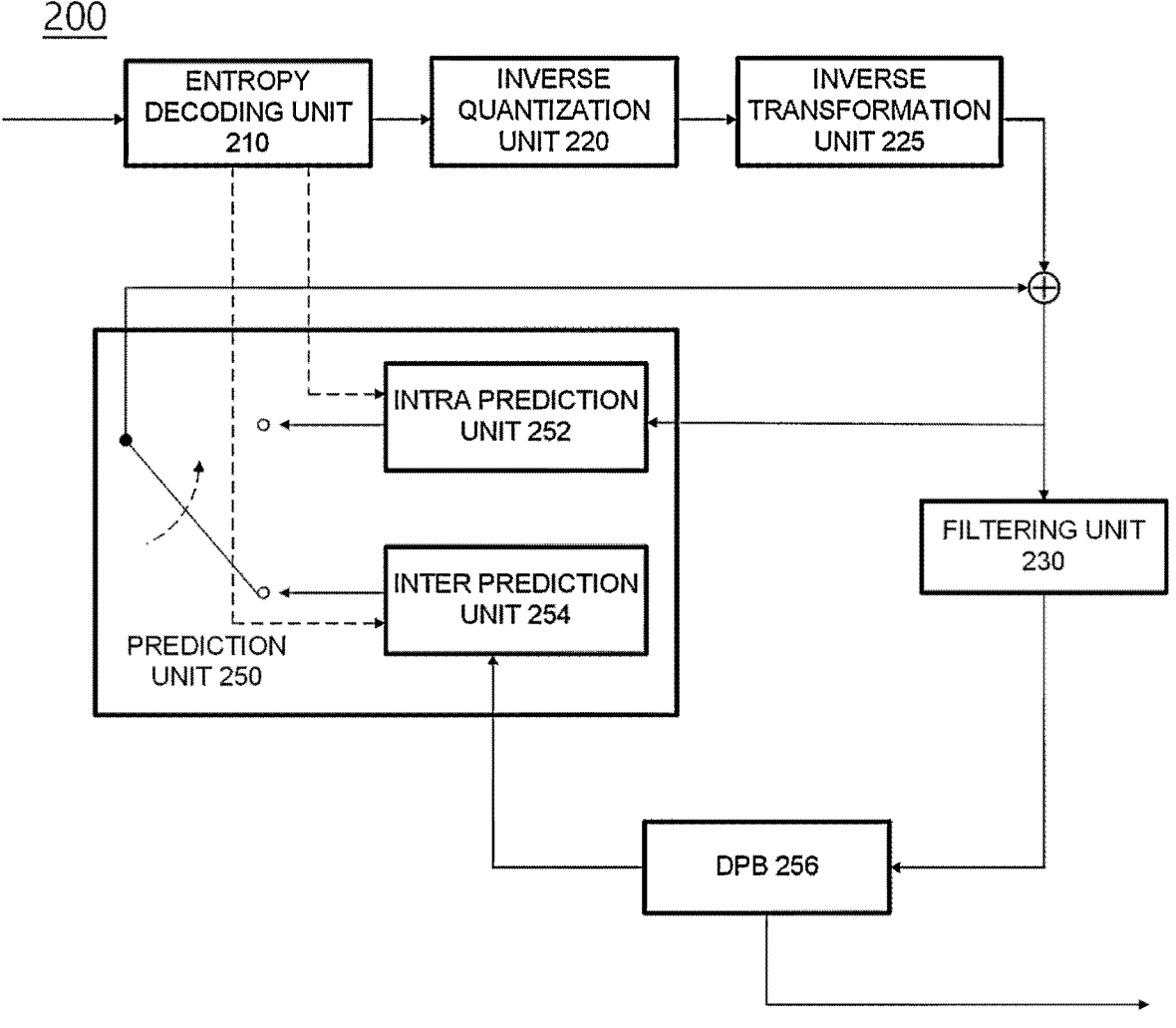
FIG. 2 is a schematic block diagram of a video signal decoding apparatus according to an embodiment of the present invention.

FIG. 2 is a schematic block diagram of a video signal decoding apparatus 200 according to an embodiment of the present invention. Referring to FIG. 2, the decoding apparatus 200 of the present invention includes an entropy decoding unit 210, an inverse quantization unit 220, an inverse transformation unit 225, a filtering unit 230, and a prediction unit 250.

The entropy decoding unit 210 entropy-decodes a video signal bitstream to extract transform coefficient, intra encoding information, inter encoding information, and the like for each region. The inverse quantization unit 220 inverse-quantizes the entropy-decoded transform coefficient, and the inverse transformation unit 225 restores a residual value by using the inverse-quantized transform coefficient. The video signal processing device 200 restores an original pixel value by summing the residual value obtained by the inverse transformation unit 225 with a prediction value obtained by the prediction unit 250.

Meanwhile, the filtering unit 230 performs filtering on a picture to improve image quality. This may include a deblocking filter for reducing block distortion and/or an adaptive loop filter for removing distortion of the entire picture. The filtered picture is outputted or stored in the DPB 256 for use as a reference picture for the next picture.

The prediction unit 250 includes an intra prediction unit 252 and an inter prediction unit 254. The prediction unit 250 generates a prediction picture by using the encoding type decoded through the entropy decoding unit 210 described above, transform coefficients for each region, and intra/inter encoding information. In order to reconstruct a current block in which decoding is performed, a decoded region of the current picture or other pictures including the current block may be used. A picture (or, tile/slice) for which only the current picture is used for reconstruction, that is, for which only intra prediction is performed for reconstruction, is called an intra picture or an I picture (or, tile/slice), and a picture (or, tile/slice) for which both intra prediction and inter prediction can be performed for reconstruction is called an inter picture (or, tile/slice). In order to predict sample values of each block among inter pictures (or, tiles/slices), a picture (or, tile/slice) using up to one motion vector and a reference picture index is called a predictive picture or P picture (or, tile/slice), and a picture (or tile/slice) using up to two motion vectors and a reference picture index is called a bi-predictive picture or a B picture (or tile/slice). In other words, the P picture (or, tile/slice) uses up to one motion information set to predict each block, and the B picture (or, tile/slice) uses up to two motion information sets to predict each block. Here, the motion information set includes one or more motion vectors and one reference picture index.

The intra prediction unit 252 generates a prediction block using the intra encoding information and reconstructed samples in the current picture. As described above, the intra coding information can include at least one of the intra prediction mode, the most probable mode (MPM) flag, and the MPM index. The intra prediction unit 252 predicts pixel values of the current block by using reconstructed pixels located on the left of and/or above the current block as reference pixels. According to an embodiment, the reference pixels may be pixels adjacent to a left boundary and/or pixels adjacent to an above boundary of the current block. According to another embodiment, the reference pixels may be pixels adjacent within a preset distance from the left boundary of the current block among pixels of neighboring blocks of the current block and/or pixels adjacent within a preset distance from the above boundary of the current block. In this case, the neighboring blocks of the current block may include at least one of a left L block, an above A block, a below left BL block, an above right AR block, or an above left AL block adjacent to the current block.

The inter prediction unit 254 generates a prediction block using reference pictures and inter encoding information stored in the DPB 256. The inter coding information may include motion information (reference picture index, motion vector information, etc.) of the current block for the reference block. Inter prediction may include L0 prediction, L1 prediction, and bi-prediction. L0 prediction means prediction using one reference picture included in the L0 picture list, and L1 prediction means prediction using one reference picture included in the L1 picture list. For this, one set of motion information (e.g., motion vector and reference picture index) may be required. In the bi-prediction method, up to two reference regions may be used, and the two reference regions may exist in the same reference picture or may exist in different pictures. That is, in the bi-prediction method, up to two sets of motion information (e.g., a motion vector and a reference picture index) may be used and two motion vectors may correspond to the same reference picture index or different reference picture indexes. In this case, the reference pictures may be displayed (or outputted) both before and after the current picture in time aspect.

The inter prediction unit 254 can obtain the reference block of the current block by using the motion vector and the reference picture index. The reference block exists in the reference picture corresponding to the reference picture index. In addition, a pixel value of a block specified by the motion vector or an interpolated value thereof can be used as a predictor of the current block. For motion prediction with pixel accuracy in units of sub-pels, for example, an 8-tap interpolation filter can be used for a luma signal and a 4-tap interpolation filter can be used for a chroma signal. However, the interpolation filter for motion prediction in units of sub-pels is not limited thereto. As described above, the inter prediction unit 254 performs motion compensation for predicting the texture of the current unit from the previously reconstructed picture using motion information.

The reconstructed video picture is generated by adding the predict value outputted from the intra prediction unit 252 or the inter prediction unit 254 and the residual value outputted from the inverse transformation unit 225. That is, the video signal decoding apparatus 200 reconstructs the current block using the prediction block generated by the prediction unit 250 and the residual obtained from the inverse transformation unit 225.

Meanwhile, the block diagram of FIG. 2 shows a decoding apparatus 200 according to an embodiment of the present invention, and separately displayed blocks logically distinguish and show the elements of the decoding apparatus 200. Accordingly, the elements of the above-described decoding apparatus 200 may be mounted as one chip or as a plurality of chips depending on the design of the device. According to an embodiment, the operation of each element of the above-described decoding apparatus 200 may be performed by a processor (not shown).

Figure 3:
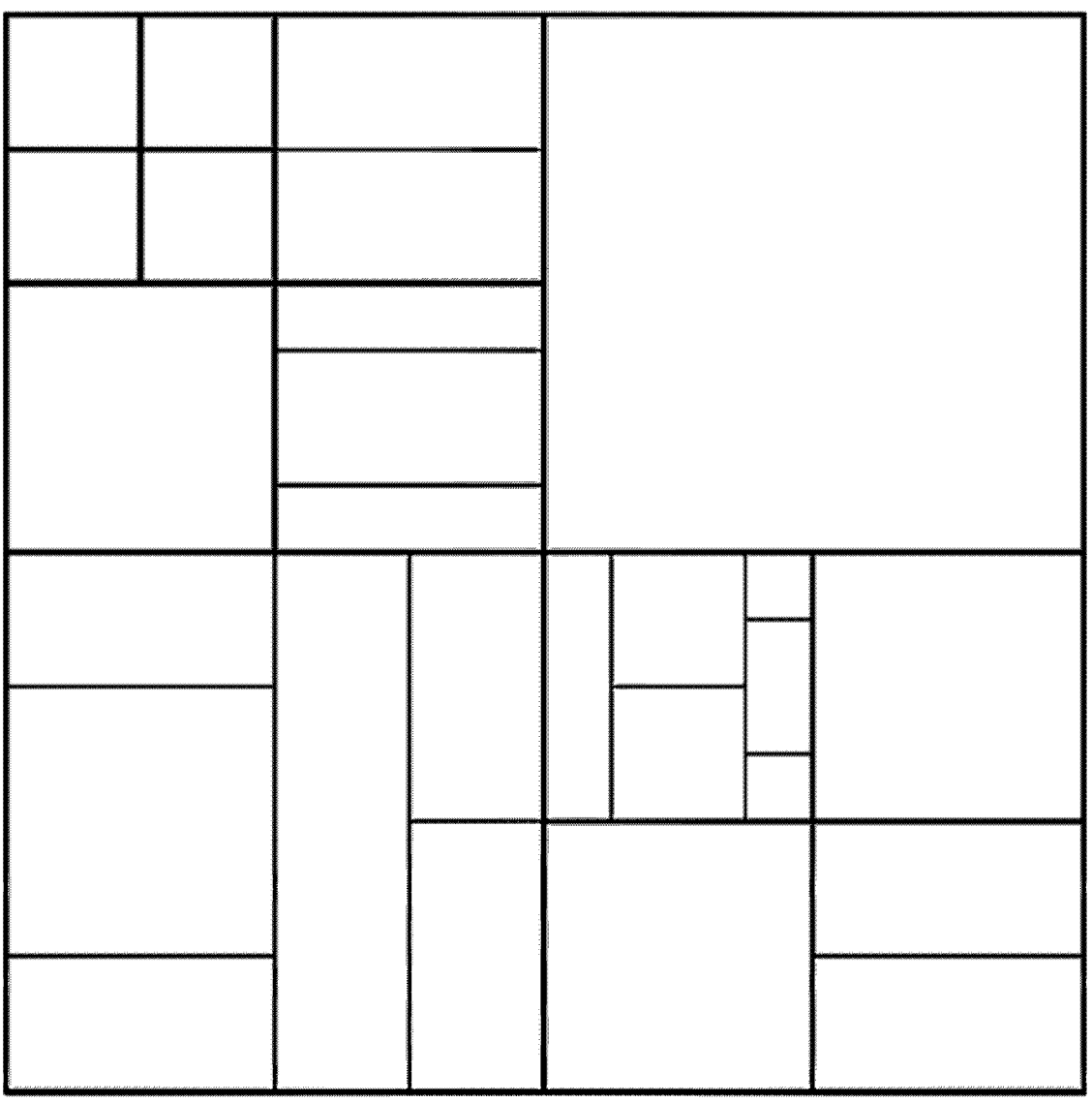
FIG. 3 shows an embodiment in which a coding tree unit is divided into coding units in a picture.

FIG. 3 illustrates an embodiment in which a coding tree unit (CTU) is split into coding units (CUs) in a picture. In the coding process of a video signal, a picture may be split into a sequence of coding tree units (CTUs). The coding tree unit is composed of an N×N block of luma samples and two blocks of chroma samples corresponding thereto. The coding tree unit can be split into a plurality of coding units. The coding unit refers to a basic unit for processing a picture in the process of processing the video signal described above, that is, intra/inter prediction, transformation, quantization, and/or entropy coding. The size and shape of the coding unit in one picture may not be constant. The coding unit may have a square or rectangular shape. The rectangular coding unit (or rectangular block) includes a vertical coding unit (or vertical block) and a horizontal coding unit (or horizontal block). In the present specification, the vertical block is a block whose height is greater than the width, and the horizontal block is a block whose width is greater than the height. Further, in this specification, a non-square block may refer to a rectangular block, but the present invention is not limited thereto. The encoding device 100 and the decoding device 200 have been described as above. The device for processing the video signal described below can include at least one of the encoding device 100 and the decoding device 200.

Referring to FIG. 3, the coding tree unit is first split into a quad tree (QT) structure. That is, one node having a 2N×2N size in a quad tree structure may be split into four nodes having an N×N size. In the present specification, the quad tree may also be referred to as a quaternary tree. Quad tree split can be performed recursively, and not all nodes need to be split with the same depth.

Meanwhile, the leaf node of the above-described quad tree may be further split into a multi-type tree (MTT)

structure. According to an embodiment of the present invention, in a multi-type tree structure, one node may be split into a binary or ternary tree structure of horizontal or vertical division. That is, in the multi-type tree structure, there are four split structures such as vertical binary split, horizontal binary split, vertical ternary split, and horizontal ternary split. According to an embodiment of the present invention, in each of the tree structures, the width and height of the nodes may all have powers of 2. For example, in a binary tree (BT) structure, a node of a 2N×2N size may be split into two N×2N nodes by vertical binary split, and split into two 2N×N nodes by horizontal binary split. In addition, in a ternary tree (TT) structure, a node of a 2N×2N size is split into (N/2)×2N, N×2N, and (N/2)×2N nodes by vertical ternary split, and split into 2N×(N/2), 2N×N, and 2N×(N/2) nodes by horizontal ternary split. This multi-type tree split can be performed recursively.

The leaf node of the multi-type tree can be a coding unit. If the coding unit is not too large for the maximum transform length, the corresponding coding unit is used as a unit of prediction and transform without further splitting. Meanwhile, in the quad tree and multi-type tree described above, at least one of the following parameters may be predefined or transmitted through an RBSP of higher level sets such as PPS, SPS, or VPS. 1) CTU size: root node size of quad tree, 2) minimum QT size MinQtSize: minimum allowed QT leaf node size, 3) maximum BT size MaxBtSize: maximum allowed BT root node size, 4) Maximum TT size MaxTtSize: maximum allowed TT root node size, 5) Maximum MTT depth MaxMttDepth: maximum allowed depth of MTT split from QT's leaf node, 6) Minimum BT size MinBtSize: minimum allowed BT leaf node size, 7) Minimum TT size MinTtSize: minimum allowed TT leaf node size.

Figure 4:
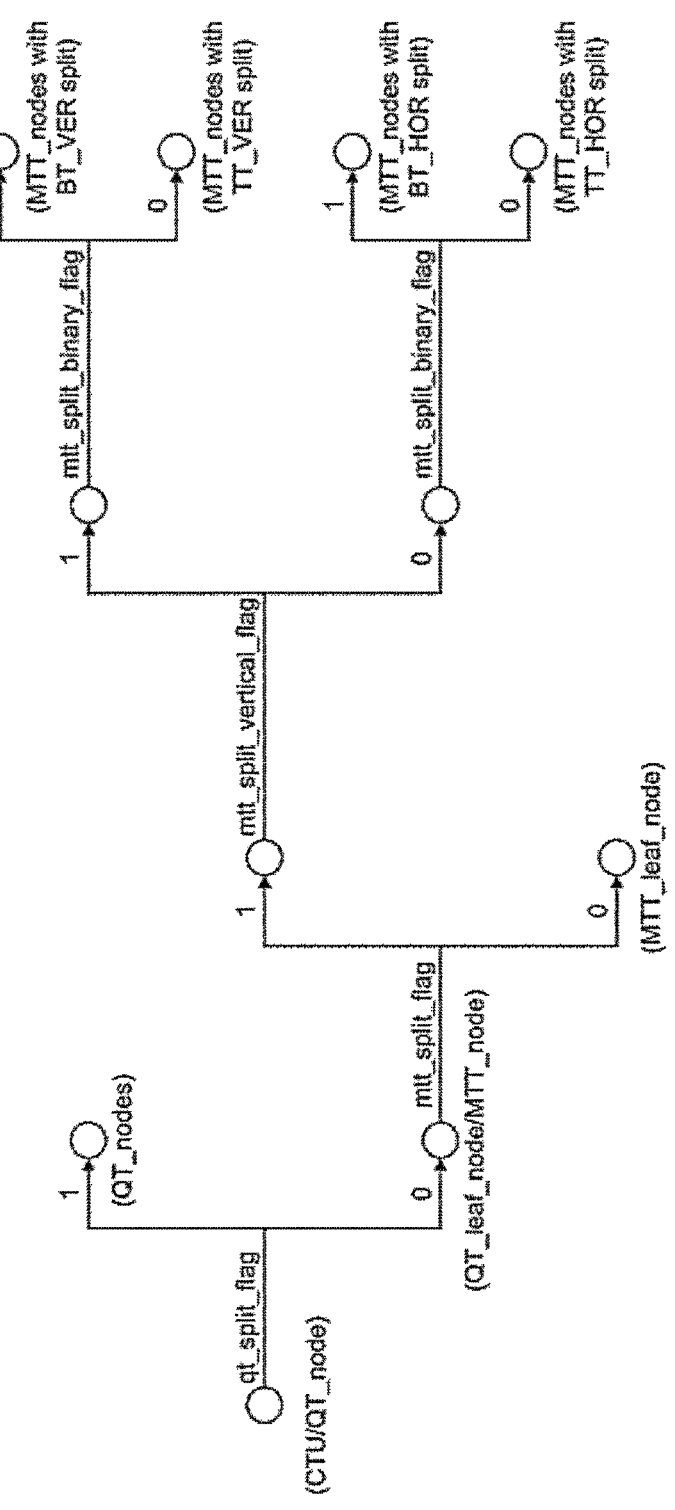
FIG. 4 shows an embodiment of a method for signaling a division of a quad tree and a multi-type tree.

FIG. 4 shows an embodiment of a method for signaling the split of a quad tree and a multi-type tree. Preset flags may be used to signal the split of the above-described quad tree and multi-type tree. Referring to FIG. 4, at least one of a flag 'qt_split_flag' indicating whether to split the quad tree node, a flag 'mtt_split_flag' indicating whether to split the multi-type tree node, a flag 'mtt_split_vertical_flag' indicating a split direction of a multi-type tree node, or a flag 'mtt_split_binary_flag' indicating a split shape of a multi-type tree node may be used.

According to an embodiment of the present invention, the coding tree unit is a root node of a quad tree, and can be first split into a quad tree structure. In the quad tree structure, 'qt_split_flag' is signaled for each node 'QT_node'. If the value of 'qt_split_flag' is 1, the node is split into 4 square nodes, and if the value of 'qt_split_flag' is 0, the corresponding node becomes the leaf node 'QT_leaf_node' of the quad tree.

Each quad tree leaf node 'QT_leaf_node' may be further split into a multi-type tree structure. In the multi-type tree structure, 'mtt_split_flag' is signaled for each node 'MTT_node'. When the value of 'mtt_split_flag' is 1, the corresponding node is split into a plurality of rectangular nodes, and when the value of 'mtt_split_flag' is 0, the corresponding node is a leaf node 'MTT_leaf_node' of the multi-type tree. When the multi-type tree node 'MTT_node' is split into a plurality of rectangular nodes (i.e., when the value of 'mtt_split_flag' is 1), 'mtt_split_vertical_flag' and 'mtt_split_binary_flag' for the node 'MTT_node' may be additionally signaled. When the value of 'mtt_split_vertical_flag' is 1, vertical split of node 'MTT_node' is indicated, and when the value of 'mtt_split_vertical_flag' is 0, horizontal split of node 'MTT_node' is indicated. In addition, when the value of 'mtt_split_binary_flag' is 1, the node 'MTT_node' is split into 2 rectangular nodes, and when the value of 'mtt_split_binary_flag' is 0, the node 'MTT_node' is split into 3 rectangular nodes.

Figure 5:
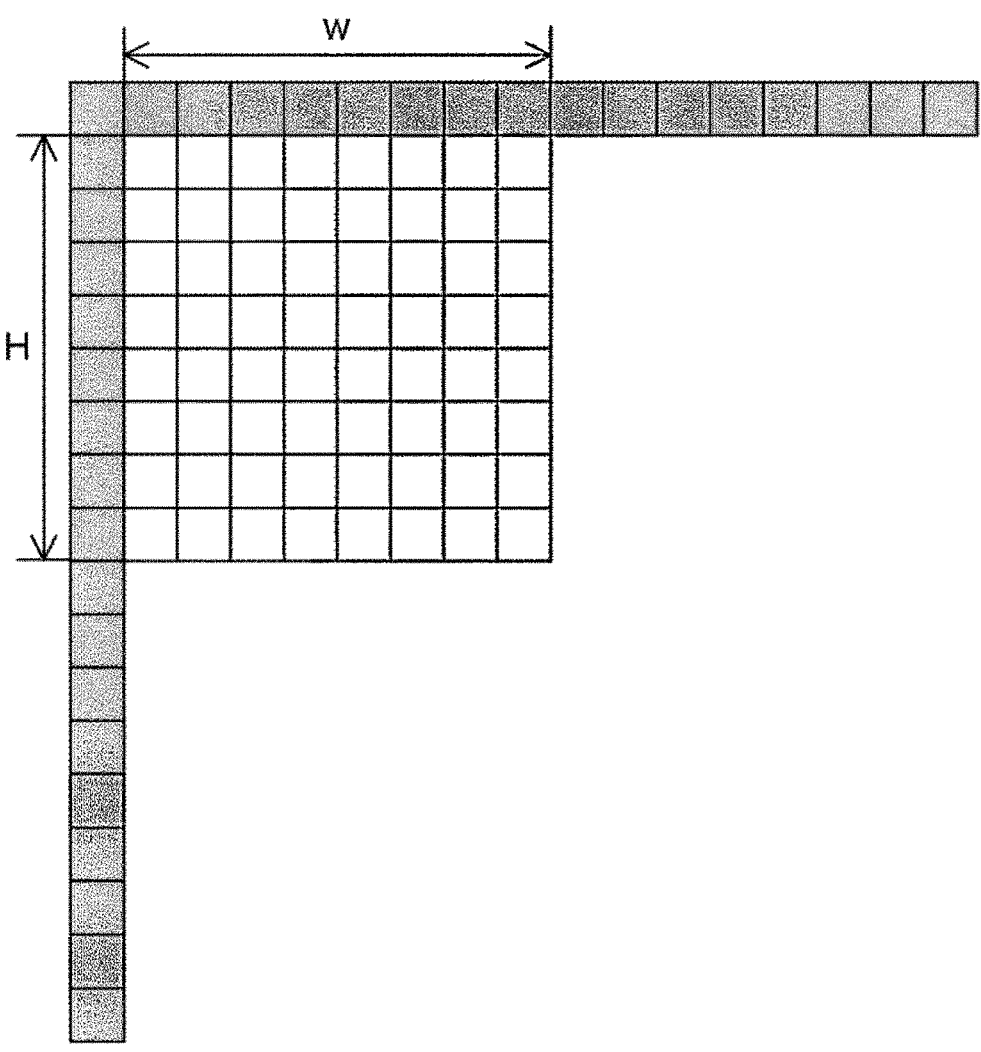
FIG. 5 illustrates an embodiment of reference samples used for prediction of a current block in an intra prediction mode.
Figure 6:
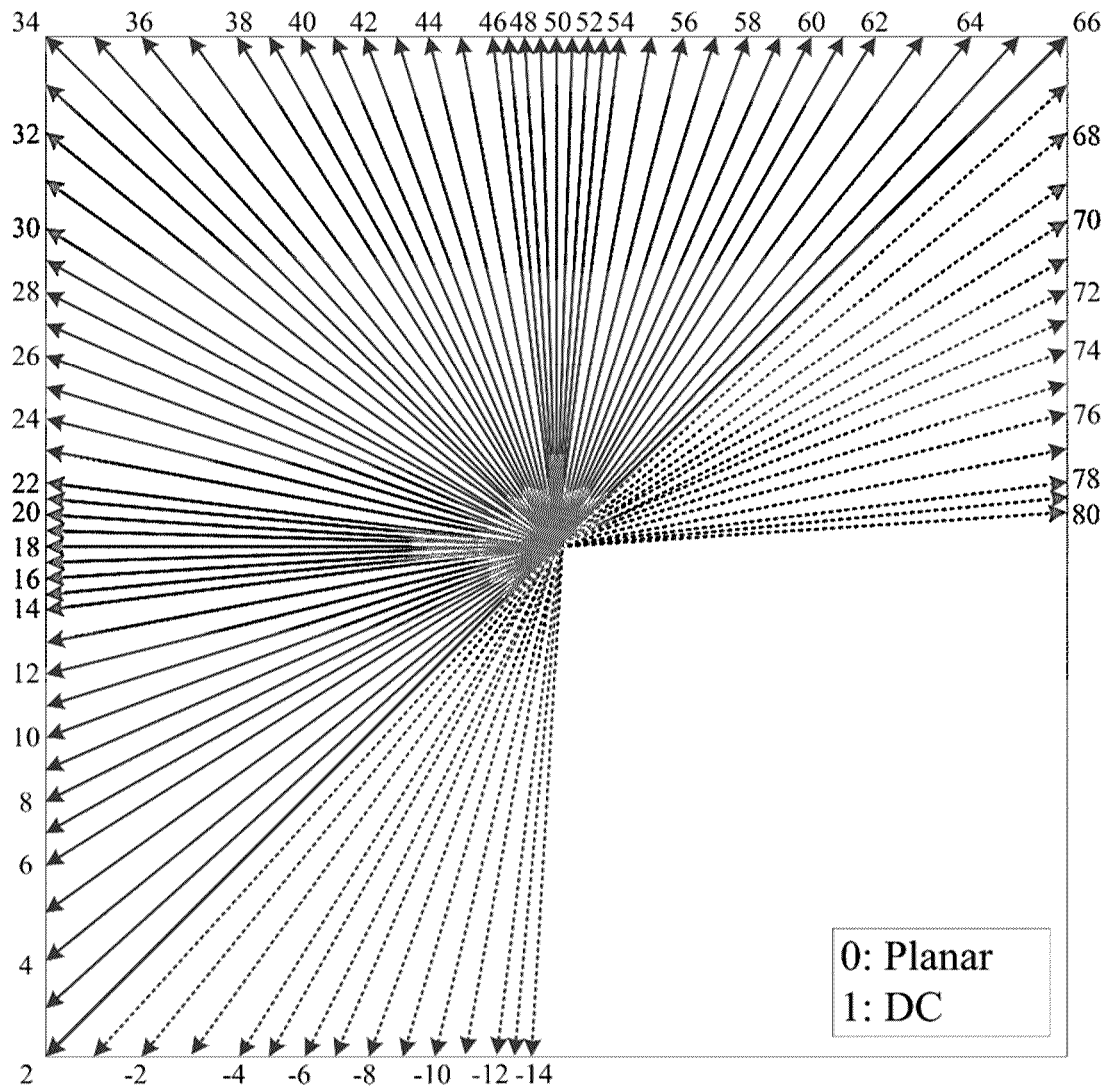
FIG. 6 illustrates an embodiment of prediction modes used for intra prediction.

FIGS. 5 and 6 illustrate an intra prediction method according to an embodiment of the present disclosure in more detail. As described above, the intra prediction unit predicts pixel values of the current block by using reconstructed pixels located on the left of and/or above the current block as reference pixels.

First, FIG. 5 illustrates an embodiment of reference samples used for prediction of the current block in the intra prediction mode. According to an embodiment, the reference pixels may be pixels adjacent to a left boundary and/or pixels adjacent to an above boundary of the current block. As illustrated in FIG. 5, when the size of the current block is W×H and pixels of a single reference line adjacent to the current block are used for intra prediction, reference pixels may be set using up to (2 W+2H+1) adjacent pixels located on the left of and/or above the current block. Meanwhile, according to an additional embodiment of the present disclosure, pixels of multiple reference lines may be used for intra prediction of the current block. The multiple reference lines may be composed of n lines located within a preset range from the current block. According to an embodiment, when pixels of the multiple reference lines are used for intra prediction, separate index information indicating lines to be set as reference pixels may be signaled. When at least some adjacent pixels to be used as the reference pixels have not yet been reconstructed, the intra prediction unit may obtain the reference pixels by performing a reference sample padding process according to a preset rule. In addition, the intra prediction unit may perform a reference sample filtering process to reduce an intra prediction error. That is, the reference pixels may be obtained by performing filtering on adjacent pixels and/or pixels obtained by the reference sample padding process. The intra prediction unit predicts the pixels of the current block using the reference pixels obtained in this way.

Next, FIG. 6 shows an embodiment of prediction modes used for intra prediction. For intra prediction, intra prediction mode information indicating an intra prediction direction may be signaled. The intra prediction mode information indicates one of a plurality of intra prediction modes included in the intra prediction mode set. When the current block is an intra prediction block, the decoder receives intra prediction mode information of the current block from the bitstream. The intra prediction unit of the decoder performs intra prediction on the current block based on the extracted intra prediction mode information.

According to an embodiment of the present invention, the intra prediction mode set may include all intra prediction modes used in intra prediction (e.g., a total of 67 intra prediction modes). More specifically, the intra prediction mode set may include a planar mode, a DC mode, and a plurality (e.g., 65) of angle modes (i.e., directional modes). Each intra prediction mode may be indicated through a preset index (i.e., intra prediction mode index). For example, as shown in FIG. 6, the intra prediction mode index 0 indicates a planar mode, and the intra prediction mode index 1 indicates a DC mode. Also, the intra prediction mode indexes 2 to 66 may indicate different angle modes, respectively. The angle modes respectively indicate angles which are different from each other within a preset angle range. For example, the angle mode may indicate an angle within an angle range (i.e., a first angular range) between 45 degrees and −135 degrees clockwise. The angle mode may be defined based on the 12 o'clock direction. In this case, the intra prediction mode index 2 indicates a horizontal diagonal (HDIA) mode, the intra prediction mode index 18 indicates a horizontal (Horizontal, HOR) mode, the intra prediction mode index 34 indicates a diagonal (DIA) mode, the intra prediction mode index 50 indicates a vertical (VER) mode, and the intra prediction mode index 66 indicates a vertical diagonal (VDIA) mode.

Meanwhile, the preset angle range may be set differently depending on a shape of the current block. For example, if the current block is a rectangular block, a wide angle mode indicating an angle exceeding 45 degrees or less than −135 degrees in a clockwise direction may be additionally used. When the current block is a horizontal block, an angle mode may indicate an angle within an angle range (i.e., a second angle range) between (45+offset1) degrees and (−135+offset1) degrees in a clockwise direction. In this case, angle modes 67 to 76 outside the first angle range may be additionally used. In addition, if the current block is a vertical block, the angle mode may indicate an angle within an angle range (i.e., a third angle range) between (45−offset2) degrees and (−135−offset2) degrees in a clockwise direction. In this case, angle modes −10 to −1 outside the first angle range may be additionally used. According to an embodiment of the present disclosure, values of offset1 and offset2 may be determined differently depending on a ratio between the width and height of the rectangular block. In addition, offset1 and offset2 may be positive numbers.

According to a further embodiment of the present invention, a plurality of angle modes configuring the intra prediction mode set may include a basic angle mode and an extended angle mode. In this case, the extended angle mode may be determined based on the basic angle mode.

According to an embodiment, the basic angle mode is a mode corresponding to an angle used in intra prediction of the existing high efficiency video coding (HEVC) standard, and the extended angle mode may be a mode corresponding to an angle newly added in intra prediction of the next generation video codec standard. More specifically, the basic angle mode may be an angle mode corresponding to any one of the intra prediction modes {2, 4, 6, . . . , 66}, and the extended angle mode may be an angle mode corresponding to any one of the intra prediction modes {3, 5, 7, . . . , 65}. That is, the extended angle mode may be an angle mode between basic angle modes within the first angle range. Accordingly, the angle indicated by the extended angle mode may be determined based on the angle indicated by the basic angle mode.

According to another embodiment, the basic angle mode may be a mode corresponding to an angle within a preset first angle range, and the extended angle mode may be a wide angle mode outside the first angle range. That is, the basic angle mode may be an angle mode corresponding to any one of the intra prediction modes {2, 3, 4, . . . , 66}, and the extended angle mode may be an angle mode corresponding to any one of the intra prediction modes {−10, −9, . . . , −1} and {67, 68, . . . , 76}. The angle indicated by the extended angle mode may be determined as an angle on a side opposite to the angle indicated by the corresponding basic angle mode. Accordingly, the angle indicated by the extended angle mode may be determined based on the angle indicated by the basic angle mode. Meanwhile, the number of extended angle modes is not limited thereto, and additional extended angles may be defined according to the size and/or shape of the current block. For example, the extended angle mode may be defined as an angle mode corresponding to any one of the intra prediction modes {−14, −13, . . . , −1} and {67, 68, . . . , 80}. Meanwhile, the total number of intra prediction modes included in the intra prediction mode set may vary depending on the configuration of the basic angle mode and extended angle mode described above.

In the embodiments described above, the spacing between the extended angle modes may be set based on the spacing between the corresponding basic angle modes. For example, the spacing between the extended angle modes {3, 5, 7, . . . , 65} may be determined based on the spacing between the corresponding basic angle modes {2, 4, 6, . . . , 66}. In addition, the spacing between the extended angle modes {−10, −9, . . . , −1} may be determined based on the spacing between corresponding basic angle modes {56, 57, . . . , 65} on the opposite side, and the spacing between the extended angle modes {67, 68, . . . , 76} may be determined based on the spacing between the corresponding basic angle modes {3, 4, . . . , 12} on the opposite side. The angular spacing between the extended angle modes may be set to be the same as the angular spacing between the corresponding basic angle modes. In addition, the number of extended angle modes in the intra prediction mode set may be set to be less than or equal to the number of basic angle modes.

According to an embodiment of the present disclosure, the extended angle mode may be signaled based on the basic angle mode. For example, the wide angle mode (i.e., the extended angle mode) may replace at least one angle mode (i.e., the basic angle mode) within the first angle range. The basic angle mode to be replaced may be a corresponding angle mode on a side opposite to the wide angle mode. That is, the basic angle mode to be replaced is an angle mode that corresponds to an angle in an opposite direction to the angle indicated by the wide angle mode or that corresponds to an angle that differs by a preset offset index from the angle in the opposite direction. According to an embodiment of the present disclosure, the preset offset index is 1. The intra prediction mode index corresponding to the basic angle mode to be replaced may be remapped to the wide angle mode to signal the corresponding wide angle mode. For example, the wide angle modes {−10, −9, . . . , −1} may be signaled by the intra prediction mode indices {57, 58, . . . , 66}, respectively, and the wide angle modes {67, 68, 76} may be signaled by the intra prediction mode indices {2, 3, . . . , 11}, respectively. In this way, the intra prediction mode index for the basic angle mode signals the extended angle mode, and thus the same set of intra prediction mode indices may be used for signaling the intra prediction mode even if the configuration of the angle modes used for intra prediction of each block are different from each other. Accordingly, signaling overhead due to a change in the intra prediction mode configuration may be minimized.

Meanwhile, whether or not to use the extended angle mode may be determined based on at least one of the shape and size of the current block. According to an embodiment, if the size of the current block is greater than a preset size, the extended angle mode may be used for intra prediction of the current block, otherwise, only the basic angle mode may be used for intra prediction of the current block. According to another embodiment, if the current block is a block other than a square, the extended angle mode may be used for intra prediction of the current block, and if the current block is a square block, only the basic angle mode may be used for intra prediction of the current block.

The intra prediction unit determines reference pixels and/or interpolated reference pixels to be used for intra prediction of the current block based on intra prediction mode information of the current block. When the intra prediction mode index indicates a specific angle mode, the reference pixel corresponding to the specific angle from the current pixel of the current block or the interpolated reference pixel is used for prediction of the current pixel. Therefore, different sets of reference pixels and/or interpolated reference pixels may be used for intra prediction according to the intra prediction mode. After intra prediction of the current block is performed using the reference pixels and intra prediction mode information, the decoder reconstructs pixel values of the current block by adding the residual signal of the current block obtained from the inverse transformation unit and the intra predictor of the current block.

Figure 7:
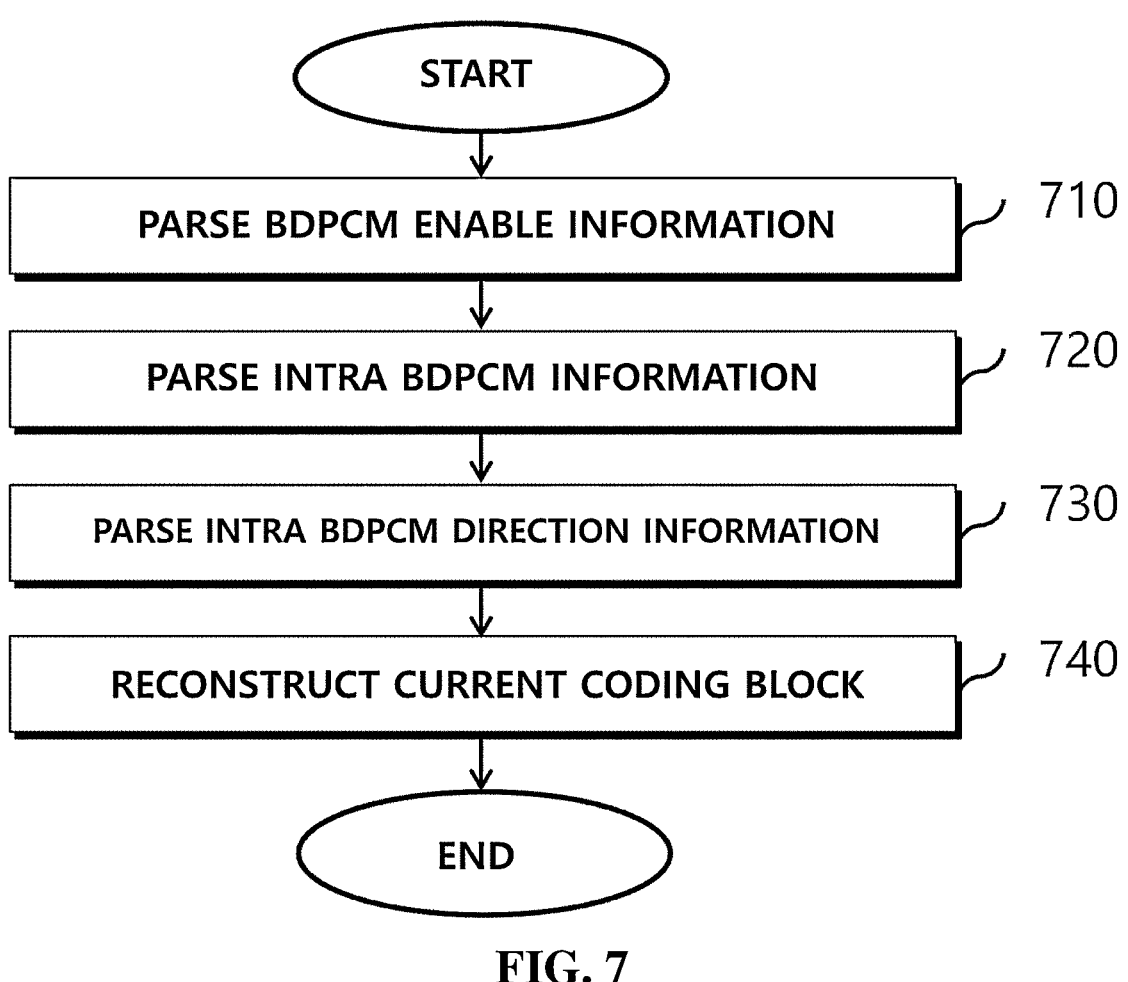
FIG. 7 is a flowchart illustrating an operation of a device for processing a video signal according to an embodiment of the present disclosure.

FIG. 7 is a flowchart illustrating an operation of a device for processing a video signal according to an embodiment of the present disclosure.

Each step of FIG. 7 will be described in detail together with FIGS. 9 to 13.

FIG. 8 is a diagram illustrating a prediction mode and a quantized residual signal of block DPCM (BDPCM) according to an embodiment of the present disclosure.

The block-based delta pulse code modulation (BDPCM) may be one of the intra prediction methods. The BDPCM may use two intra prediction modes. Among general intra prediction modes, a vertical prediction mode and a horizontal prediction mode may be used. When the total number of 67 intra prediction modes is used, an index of the vertical prediction mode may be number 50 and an index of the horizontal prediction mode may be number 18. When using the BDPCM, one of two modes may be signaled. When the BDPCM is applied to the current coding block, unfiltered samples may be used as the reference samples. When the vertical prediction mode is applied to the BDPCM, samples corresponding to the width of the current coding block may be used, and each sample may be predicted with the same value in the corresponding column. When the horizontal prediction mode is applied to the BDPCM, samples corresponding to the height of the current coding block may be used, and each sample may be predicted with the same value for all samples in a corresponding row. The block to which the BDPCM is applied may be informed to the decoder by omitting a transform process and performing residual signal coding. "A.BDPCM prediction mode" in FIG. 8 is a method for coding a residual signal.

The size of the coding block may be M(rows)×N(cols) and $r_{i,j}$, $0{\le}i{\le}M{-}1$, $0{\le}j{\le}N{-}1$ may be a prediction residual signal. The prediction residual signal may indicate a difference between an original sample value and a prediction value predicted using the reference sample. $Q(r_{i,j})$, $0{\le}i{\le}M{-}1$, $0{\le}j{\le}N{-}1$ may be a quantized prediction residual signal in which the prediction residual signal is quantized.

When vertical BDPCM is applied, a final value may be generated as follows.

$$\tilde{r}_{i,j} = \begin{cases} Q(r_{i,j}), & i = 0, & 0 \le j \le (N-1) \\ Q(r_{i,j}) - Q(r_{(i-1),j}), & 1 \le i \le (M-1), & 0 \le j \le (N-1) \end{cases}$$

When horizontal direction BDPCM is applied, the final value may be generated as follows.

$$\tilde{r}_{i,j} = \begin{cases} Q(r_{i,j}), & 0 \le i \le (M-1), & j = 0 \\ Q(r_{i,j}) - Q(r_{i,(j-1)}), & 0 \le i \le (M-1), & 1 \le j \le (N-1) \end{cases}$$

The decoder may calculate in an opposite manner to the encoder to generate a quantized residual signal and add the quantized residual signal to a predicted value to create a reconstructed signal.

FIG. 9 is a diagram illustrating a BDPCM flag defined in a sequence parameter set.

At higher levels, the BDPCM flag may be defined and the corresponding function may be turned on/off. If the levels are listed in the order of higher level, the levels may be divided into a video parameter set, a sequence parameter set, a parameter set, etc. In the present disclosure, the flag is defined in the sequence parameter set (SPS). However, the present invention is not limited thereto. BDPCM enable information sps_bdpcm_enabled_flag indicates whether or not the BDPCM is enabled. The device for processing the video signal may perform step 710 of parsing the BDPCM enable information sps_bdpcm_enabled_flag from the bit-stream. If the BDPCM enable information sps_bdpcm_e-nabled_flag is equal to 1, it indicates that the BDPCM is enabled. If the value of the BDPCM enable information sps_bdpcm_enabled_flag is equal to 0, it may indicate that the BDPCM is not enabled. The value indicates that the BDPCM is enabled or disabled may be defined conversely, and may indicate that the BDPCM is enabled or disabled in any form.

As described above, in FIG. 9, the BDPCM enable information sps_bdpcm_enabled_flag is defined in units of sequences, but is not limited thereto. The BDPCM enable information sps_bdpcm_enabled_flag may be signaled in at least one of units of coding tree units (CTUs), units of slices, units of tiles, units of tile groups, units of pictures, units of subpictures, units of sequences, or units of videos. When the BDPCM enable information sps_bdpcm_enabled_flag is signaled in units of coding tree units (CTUs), units of slices, units of tiles, units of tile groups, units of pictures, units of subpictures, units of sequences, or units of videos, the name of the BDPCM enable information sps_bdpcm_enabled_flag may be changed. But the function thereof may be the same.

Referring to FIG. 9, the BDPCM enable information sps_bdpcm_enabled_flag may be parsed from the bitstream without special conditions. However, the present invention is not limited thereto. The device for processing the video signal may parse transform skip enable information sps_transform_skip_enabled_flag indicating whether or not transform skip information transform_skip_flag exists in a transform unit from the bitstream. The transform unit is a unit for transforming pixels included in the coding block, and may be included in the coding block. In addition, the current transform unit may be included in the current block. The transform skip enable information sps_trans-form_skip_enabled_flag may be information indicating whether or not transform skip is to be used. The transform skip enable information sps_transform_skip_enabled_flag may be signaled in units of sequences. When the transform skip enable information sps_transform_skip_enabled_flag is 1, it indicates that the transform skip information trans-form_skip_flag exists, and the device for processing the video signal may parse the transform skip information transform_skip_flag from the bitstream later. When the transform skip enable information sps_transform_skip_en-abled_flag is 0, it may indicate that the transform skip information transform_skip_flag does not exist, and the device for processing the video signal may not parse the transform skip information transform_skip_flag from the bitstream later. The fact that the decoder of the device for processing the video signal does not parse transform skip information may indicate that the encoder of the device for processing the video signal does not generate the transform skip information. According to the present disclosure, when the transform skip enable information sps_trans-form_skip_enabled_flag is 1, the device for processing the video signal may parse the BDPCM enable information sps_bdpcm_enabled_flag from the bitstream.

FIG. 10 is a diagram illustrating a part of a coding unit syntax structure.

FIG. 10 illustrates a structure of information required in units of coding blocks to be predicted, and the encoder may signal according to the corresponding condition, and the decoder may also parse and obtain information from the bitstream according to the corresponding condition.

If pcm_flag[x0][y0] at the upper-left coordinates (x0, y0) of the corresponding coding block is equal to a value of 0 indicating that a pcm mode is not applied, it may be checked whether treeType is SINGLE_TREE or DUAL_TREE_LUMA. When the treeType is SINGLE_TREE or DUAL_TREE_LUMA, the device for processing the video signal may parse intra BDPCM information intra_bdpcm_flag from the bitstream. The intra BDPCM informa-tion intra_bdpcm_flag may indicate whether or not the BDPCM is applied to the current block. When the intra BDPCM information intra_bdpcm_flag is 1, it may mean that the BDPCM is applied to the current block. In addition, when the intra BDPCM information intra_bdpcm_flag is 0, it may mean that BDPCM is not applied to the current block. However, the present invention is not limited thereto. When the intra BDPCM information intra_bdpcm_flag is 0, it may mean that the BDPCM is applied to the current block, and when the intra BDPCM information intra_bdpcm_flag is 1, it may mean that the BDPCM is not applied to the current block.

The intra BDPCM information intra_bdpcm_flag may be expressed in a format such as intra_bdpcm_flag[x0][y0]. Here, x0 and y0 may be coordinates of the current block. More specifically, x0 and y0 may be coordinates of the above left pixel of the current block In order for the intra BDPCM information intra_bdpcm_flag to be parsed, the conditions for the width and height of the corresponding coding unit and the enable/disable conditions of the BDPCM enable information sps_bdpcm_enabled_flag may have to be satisfied. For example, both the width and the height are less than or equal to 32, and the BDPCM enable information sps_bdpcm_e-nabled_flag may have to be equal to 1 indicating that the BDPCM enable information sps_bdpcm_enabled_flag is enabled. If the BDPCM enable information sps_bdpcm_e-nabled_flag is equal to 1 indicating that the intra BDPCM information intra_bdpcm_flag[x0][y0] is used, intra BDPCM direction information intra_bdpcm_dir_flag[x0][y0]) may be signaled/parsed. The corresponding flag may indicate a prediction mode applied to the BDPCM. The prediction mode may be one of a horizontal direction prediction mode number 18 and a vertical direction predic-tion mode number 50. If the intra BDPCM direction infor-mation intra_bdpcm_dir_flag[x0][y0] value is 0, the intra prediction mode number 18 may be indicated, and if the intra BDPCM direction information intra_bdpcm_dir_flag[x0][y0] value is 1, the intra prediction mode number 50 may be indicated. Whether or not to use a BDPCM function in the coding block may be determined by the value of sps_bdpcm_enabled_flag defined at the higher level.

FIG. 11 is a diagram illustrating a part of coding unit syntax and includes a size variable of a block to which BDPCM is applied.

It is also possible to variably change the size of the block to which the BDPCM is applied through a preset variable or to apply the size of the block to which the BDPCM is applied together with other preset variables. When the BDPCM enable information sps_bdpcm_enabled_flag indicates that the BDPCM is enabled, the width of the current block is less than or equal to the first value Value1, and the height of the current block is less than or equal to the second value Value2, the device for processing the video signal may perform step 720 of parsing the intra BDPCM information intra_bdpcm_flag indicating whether or not the BDPCM is to be applied to the current block from the bitstream.

More specifically, the condition for signaling/parsing the intra BDPCM information intra_bdpcm_flag[x0][y0] may be a case in which a coding block width cbWidth is equal to or less than the first value Value1, or a coding block height cbHeight is equal to or less than the second value Value2. Value1 and Value2 may be the same or different values. For example, the first value Value1 and the second value Value2 may be the maximum block size MaxTsSize to which transform skip is applied. The maximum block size MaxTs-Size to which transform skip is applied may be the maximum block size that allows transform skip. The maximum block size MaxTsSize that allows transform skip may be a value between 4 and 32. The maximum block size MaxTs-Size that allows transform skip may be defined as follows. A syntax variable log 2_transform_skip_max_size_minus2 indicates the maximum block size to which transform skip is applied, and the value thereof may be between 0 and 3. If the corresponding variable log 2_transform_skip_max_size_minus2 does not exist, the value may be inferred as 0. The maximum block size MaxTsSize which is a variable that allows transform skip is set, using the corresponding variable log 2_transform_skip_max_size_minus, as 1<<(log 2_transform_skip_max_size_minus2+2).

Alternatively, it is possible to set a separate block size variable for the BDPCM without using log 2_transform_skip_max_size_minus2 related to the transform skip condition. For example, a variable MaxBdpcmSize may be used. The size of MaxBdpcmSize may be set based on a value signaled as log 2_bdpcm_max_size_minus2. MaxBdpcmSize may be set to 1<<(log 2_transform_skip_max_size_minus2+2). The log 2_transform_skip_max_size_minus2 may be the maximum value at 0, and the maximum value may be one of values of 7, 6, 5, 4, 3, 2, and 1. When log 2_transform_skip_max_size_minus2 related to the transform skip condition is used, no additional variable setting is required, and thus there may be no information to be additionally transmitted from the encoder to the decoder. Otherwise, when log 2_bdpcm_max_size_minus2 is used, an additional variable such as log 2_bdpcm_max_size_minus2 is required, but the degree of freedom of the size of the block may increase. It is also possible to set Value1 and Value2 differently in a similar manner as described above.

The device for processing the video signal may include sps_bdpcm_enabled_flag in a signaling/parsing condition of the intra BDPCM information intra_bdpcm_flag. It may be like sps_bdpcm_enabled_flag && cbWidth<=Value1 && cbHeight<=Value2.

More specifically, FIG. 11 illustrates the structure of information required in units of coding blocks to be predicted, and the encoder may signal according to the corresponding condition, and the decoder may also parse and obtain information from the bitstream according to the corresponding condition. Referring to line 1110, the device for processing the video signal may determine whether or not pcm_flag[x0][y0] at the above left coordinates (x0, y0) of the corresponding coding block indicates that a pcm mode is not applied. Referring to line 1120, if pcm_flag[x0][y0] at the above left coordinates (x0, y0) of the coding block is equal to a value of 0 indicating that the pcm mode is not applied, the device for processing the video signal may check whether treeType is SINGLE_TREE or DUAL_TREE_LUMA. In addition, when treeType is SINGLE_TREE or DUAL_TREE_LUMA, the device for processing the video signal may determine whether or not the BDPCM enable information sps_bdpcm_enabled_flag indicates that the BDPCM is enabled, whether or not the width of the current block is less than or equal to the first value Value1, or whether or not the height of the current block is less than or equal to the second value Value2. In line 1130, whether or not the BDPCM enable information sps_bdpcm_enabled_flag indicates the BDPCM is enabled is not described, but whether or not the BDPCM enable information sps_bdpcm_enabled_flag indicates that the BDPCM is enabled may also be determined. Here, the first value and the second value area each may be the maximum block size MaxTsSize that allows transform skip. Since the maximum block size MaxTsSize that allows transform skip has already been described, a redundant description thereof will be omitted.

Referring to line 1140, when the BDPCM enable information sps_bdpcm_enabled_flag indicates that the BDPCM is enabled, the width of the current block is less than or equal to the first value, and the height of the current block is less than or equal to the second value, the device for processing the video signal may perform step 720 of parsing the intra BDPCM information intra_bdpcm_flag from the bitstream.

The intra BDPCM information intra_bdpcm_flag may indicate whether or not the BDPCM is applied to the current block. The intra BDPCM information intra_bdpcm_flag may be expressed in a format such as intra_bdpcm_flag[x0][y0]. Here, x0 and y0 may be coordinates of the current block. More specifically, x0 and y0 may be coordinates of the above left pixel of the current block.

Referring to line 1150, the device for processing the video signal may determine whether or not the intra BDPCM information intra_bdpcm_flag[x0][y0] indicates that the BDPCM is used. Referring to line 1160, when the intra BDPCM information intra_bdpcm_flag indicates that the BDPCM is applied to the current block, step 730 of parsing the intra BDPCM direction information intra_bdpcm_dir_flag for the current block from the bitstream may be performed. The intra BDPCM direction information intra_bdpcm_dir_flag may indicate either a horizontal direction or a vertical direction. For example, when the intra BDPCM direction information intra_bdpcm_dir_flag is 0, it may indicate the horizontal direction. In addition, when the intra BDPCM direction information intra_bdpcm_dir_flag is 1, it may indicate the vertical direction. However, the present invention is not limited thereto. When the intra BDPCM direction information intra_bdpcm_dir_flag is 1, it may indicate the horizontal mode, and when the intra BDPCM direction information intra_bdpcm_dir_flag is 0, it may indicate the vertical mode.

The intra BDPCM direction information intra_bdpcm_dir_flag may indicate a prediction mode applied to the BDPCM. The prediction mode may be either the intra prediction mode number 18 or the intra prediction mode number 50. The intra prediction mode number 18 may be a horizontal prediction mode, and or the intra prediction mode number 50 may be a vertical prediction mode. If the intra BDPCM direction information intra_bdpcm_dir_flag[x0][y0] value is 0, the BDPCM prediction direction may indicate the horizontal direction, and when the intra BDPCM direction information intra_bdpcm_dir_flag[x0][y0] value is 1, the BDPCM prediction direction may indicate the vertical direction. In addition, if the value of the intra BDPCM direction information intra_bdpcm_dir_flag [x0][y0] is 0, the intra prediction mode number 18 may be indicated, and if the value of the intra BDPCM direction information intra_bdpcm_dir_flag[x0][y0] is 1, the intra prediction mode number 50 may be indicated. Whether or not the corresponding function is used in the coding block may be determined by the value of the BDPCM enable information sps_bdpcm_enabled_flag defined at the higher level.

The intra BDPCM information intra_bdpcm_flag and the intra BDPCM direction information intra_bdpcm_dir_flag may be parsed for each chroma component and each luma component. The intra BDPCM information intra_bdpcm_flag and the intra BDPCM direction information intra_bdpcm_dir_flag may be parsed for the luma component regardless of the chroma component. That is, the device for processing the video signal may parse the intra BDPCM information intra_bdpcm_luma_flag for the luma component or the intra BDPCM direction information intra_bdpcm_luma_dir_flag for the luma component in the same manner as described above, and may parse the intra BDPCM information intra_bdpcm_chroma_flag for the chroma component or the intra BDPCM direction information intra_bdpcm_chroma_dir_flag for the chroma component in a similar manner.

The process of obtaining the intra BDPCM information intra_bdpcm_luma_flag for the luma component and the intra BDPCM direction information intra_bdpcm_luma_dir_flag for the luma component may be slightly different from the process of obtaining the intra BDPCM information intra_bdpcm_chroma_flag for the chroma component and the intra BDPCM direction information intra_bdpcm_chroma_dir_flag for the chroma component. This is because the current block of the luma component and the current block of the chroma component may be different from each other. More specifically, the size or position of the current block of the luma component may be different from the size or position of the current block of the chroma component. When the BDPCM enable information sps_bdpcm_enabled_flag indicates that the BDPCM is enabled, the width of the current luma coding block is less than or equal to the first value, and the height of the current luma coding block is less than or equal to the second value, the device for processing the video signal may parse the intra BDPCM information intra_bdpcm_luma_flag for the luma component from the bitstream. Similarly, when the BDPCM enable information sps_bdpcm_enabled_flag indicates that the BDPCM is enabled, the width of the current chroma coding block is less than or equal to the first value, and the height of the current chroma coding block is less than or equal to the second value, the device for processing the video signal may parse the intra BDPCM information intra_bdpcm_chroma_flag for the chroma component from the bitstream. In addition, when the intra BDPCM information intra_bdpcm_luma_flag for the luma component indicates that BDPCM is applied to the current luma coding block, the device for processing the video signal may perform a step of parsing the luma intra BDPCM direction information intra_bdpcm_luma_dir_flag for the current luma coding block from the bitstream. Similarly, when the intra BDPCM information intra_bdpcm_chroma_flag for the chroma component indicates that the BDPCM is applied to the current chroma coding block, the device for processing the video signal may perform a step of parsing the chroma intra BDPCM direction information intra_bdpcm_chroma_dir_flag for the current chroma coding block from the bitstream. Here, the first value and the second value may each be the maximum block size MaxTsSize that allows transform skip.

In this disclosure, the intra BDPCM information intra_bdpcm_flag may include the intra BDPCM information intra_bdpcm_luma_flag for the luma component and the intra BDPCM information intra_bdpcm_chroma_flag for the chroma component. In addition, in the present disclosure, the intra BDPCM direction information intra_bdpcm_dir_flag may include the intra BDPCM direction information intra_bdpcm_luma_dir_flag for the luma component and the intra BDPCM direction information intra_bdpcm_chroma_dir_flag for the chroma component.

The device for processing the video signal may perform step 740 of reconstructing the current block based on the intra BDPCM direction information intra_bdpcm_dir_flag. Step 740 of reconstructing the current block based on the intra BDPCM direction information intra_bdpcm_dir_flag has been described together with FIG. 8, and thus a redundant description thereof will be omitted.

FIG. 12 is a diagram illustrating a part of the transform unit syntax.

For the coding block to which BDPCM is applied, the residual signal may be coded by the method described with reference to FIG. 8 without the transform process. The syntax variable that prevents the transform process from being applied to the corresponding block may be transform skip information transform_skip_flag. That is, the transform skip information transform_skip_flag may indicate whether or not to apply the transform to the corresponding block. Alternatively, when the transform skip information transform_skip_flag is equal to a predetermined value, the transform skip information transform_skip_flag may indicate that no transform is applied to the current block. When the transform skip information transform_skip_flag is 1, the transform may be skipped with respect to the corresponding transform block. In addition, when the transform skip information transform_skip_flag is 0, the transform may not be skipped with respect to the corresponding transform block. However, the present invention is not limited thereto. When the transform skip information transform_skip_flag is 0, the transform may be skipped with respect to the corresponding transform block. In addition, when the transform skip information transform_skip_flag is 1, the transform may not be skipped with respect to the corresponding transform block.

The transform skip information transform_skip_flag may be expressed in a format such as transform_skip_flag[x0][y0] for each color component. Here, x0 and y0 may be the coordinates of the corresponding transform block. More specifically, x0 and y0 may be the coordinates of the above left pixel of the corresponding block. As already described, the current block may include at least one transform block. The encoder may perform transform in units of transform blocks, and the decoder may perform inverse transform in units of transform blocks.

As a condition for signaling/parsing the transform skip information transform_skip_flag[x0][y0], first, whether a value of tu_cbf_luma[x0][y0] is 1, whether treeType is different from DUAL_TYPE_TREE_CHROMA, whether the width and height of the coding unit are less than or equal to 32, whether IntraSubPartitionsSplit[x0][y0] is equal to ISP_NO_SPLIT, whether cu_sbt_flag is equal to 0, and whether the intra BDPCM information intra_bdpcm_flag [x0][y0] is equal to 0 may have to be satisfied. In addition, the condition transform_skip_enabled_flag && tbWidth<=MaxTsSize && tbHeight<=MaxTsSize may have to be satisfied. The tbWidth may be a variable representing the width of the transform block, and the tbHeight may be a variable representing the height of the transform block.

The above conditions are exemplary, and some of the above conditions may be replaced with other conditions or deleted. Other conditions may also be added. However, some of the above conditions may be maintained to increase encoding or decoding efficiency of a video image. For example, as already described, since transform skip is applied to the coding block to which the BDPCM is applied, it is possible to know application of transform skip by inferring without signaling/parsing separate information. That is, when the intra BDPCM information intra_bdpcm_flag indicates that the BDPCM is applied to the current block, the transform skip information transform_skip_flag indicating whether or not the transform is not applied to the current block may not be parsed. As already described, when the intra BDPCM information intra_bdpcm_flag is 1, it may indicate that the BDPCM is applied to the current block. When the intra BDPCM information intra_bdpcm_flag indicates that the BDPCM is not applied to the current block, the device for processing the video signal may determine whether to parse the transform skip information transform_skip_flag by further determining at least one of the conditions described above.

When some of the above conditions are not satisfied, since the transform skip information transform_skip_flag is not parsed, a case where the transform skip information transform_skip_flag[x0][y0] does not exist may occur. For example, when the intra BDPCM information intra_bdpcm_flag indicates that BDPCM is applied to the current block, the transform skip information transform_skip_flag[x0][y0] may not exist. The device for processing the video signal may know whether or not transform skip is applied by inferring transform_skip_flag based on the intra BDPCM information intra_bdpcm_flag.

For example, if transform skip information transform_skip_flag[x0][y0] is absent and the intra BDPCM information intra_bdpcm_flag[x0][y0]) is 1, the device for processing the video signal may infer the transform skip information transform_skip_flag[x0][y0] as a first inference value. Here, the fact that the intra BDPCM information intra_bdpcm_flag is 1 may indicate that the BDPCM is applied to the current block. When the value of the transform skip information is the first inference value, it may indicate that transform is not applied to a block corresponding to the transform skip information.

In addition, if the transform skip information transform_skip_flag[x0][y0] is absent and the intra BDPCM information intra_bdpcm_flag[x0][y0] is 0, the device for processing the video signal may infer the transform skip information transform_skip_flag[x0][y0] as a second inference value. Here, the fact that the intra BDPCM information intra_bdpcm_flag is 0 may indicate that the BDPCM is not applied to the current block. When the value of the transform skip information is the second inference value, it may indicate that transform is applied to the block corresponding to the transform skip information. Here, the first inference value may be 1, and the second inference value may be 0. However, the present invention is not limited thereto, and the first inference value may be 0 and the second inference value may be 1.

If the transform skip information transform_skip_flag[x0][y0] of the block to which the BDPCM is applied is 1, a residual_ts_coding( ) function may be called. The residual signal transformed in FIG. 8 may be coded through this function. In addition, MinBdpcmSize conditions of tbWidth and tbHeight may be added in the same manner. The corresponding value may be signaled and calculated in a similar manner at a higher level. The MinBdpcmSize condition may be added and applied to the condition illustrated in FIG. 13 as well.

FIG. 13 is a diagram illustrating signaling/parsing conditions of the transform skip flag within a part of the transform unit syntax.

FIG. 13 is an embodiment similar to FIG. 12. Since transform skip is applied to the coding block to which the BDPCM is applied, it is possible to know application of transform skip by inferring without signaling/parsing separate information. Accordingly, a condition indicating that the BDPCM is not applied may be added to the conditions for signaling/parsing the transform skip flag.

As illustrated in FIG. 13, the device for processing the video signal may use a condition such as (transform_skip_enabled_flag && tbWidth<=MaxTsSize && tbHeight<=MaxTsSize && (! intra_bdpcm_flag[x0][y0])) as the condition for parsing the transform skip information transform_skip_flag. In addition, when transform_skip_enabled_flag is equal to 1, tbWidth<=MaxTsSize, tbHeight<=MaxTsSize, and intra_bdpcm_flag[x0][y0] is equal to 0, the device for processing the video signal may parse the transform skip information transform_skip_flag. That is, it is possible to signal/parse transform_skip_flag[x0][y0] only for the block to which the transform skip condition and the BDPCM are not applied.

The conditions for signaling/parsing the transform skip information transform_skip_flag[x0][y0] may be as follows. Referring to line 1310, the video signal processing device may check whether the value of tu_cbf_luma[x0][y0] is 1, whether tree Type is different from DUAL_TYPE_TREE_CHROMA, whether the width tbWidth and height tbHeight of the transform block are less than or equal to 32, whether IntraSubPartitionsSplit[x0][y0] is equal to ISP_NO_SPLIT, whether cu_sbt_flag is equal to 0, and whether the intra BDPCM information intra_bdpcm_flag[x0][y0] is equal to 0. As already described, the fact that the intra BDPCM information intra_bdpcm_flag is equal to 0 may mean that the BDPCM is not applied to the current block. In addition, referring to line 1320, the device for processing the video signal may determine whether or not a condition transform_skip_enabled_flag && tbWidth<=MaxTsSize && tbHeight<=MaxTsSize is satisfied.

The above conditions are exemplary, and some of the above conditions may be replaced with other conditions or deleted. Other conditions may also be added. However, some of the above conditions may be maintained to increase encoding or decoding efficiency of a video image. For example, as already described, since transform skip is applied to the coding block to which the BDPCM is applied, separate information may not be signaled/parsed. That is, when the intra BDPCM information intra_bdpcm_flag indicates that the BDPCM is applied to the current block, the transform skip information transform_skip_flag indicating whether or not the transform is not applied to the current block may not be parsed. As already described, when the intra BDPCM information intra_bdpcm_flag is 1, it may indicate that the BDPCM is applied to the current block. When the intra BDPCM information intra_bdpcm_flag indicates that the BDPCM is not applied to the current block, the device for processing the video signal may determine whether to parse the transform skip information transform_skip_flag by further determining at least one of the conditions described above.

When some of the above conditions are not satisfied, the case where the transform skip information transform_skip_flag[x0][y0] does not exist may occur. For example, when the intra BDPCM information intra_bdpcm_flag indicates that BDPCM is applied to the current block, the transform skip information transform_skip_flag[x0][y0]) may not exist. The device for processing the video signal may know whether or not transform skip is applied by inferring transform_skip_flag based on the intra BDPCM information intra_bdpcm_flag. For example, if the transform skip information transform_skip_flag[x0][y0] is absent and the intra BDPCM information intra_bdpcm_flag[x0][y0]) is 1, the device for processing the video signal may infer the transform skip information transform_skip_flag[x0][y0] as 1. Here, the fact that the intra BDPCM information intra_bdpcm_flag is 1 may indicate that the BDPCM is applied to the current block. In contrast, if the transform skip information transform_skip_flag[x0][y0] is absent and the intra BDPCM information intra_bdpcm_flag[x0][y0] is 0, the device for processing the video signal may infer the transform skip information transform_skip_flag[x0][y0] as 0. Here, the fact that the intra BDPCM information intra_bdpcm_flag is 0 may indicate that the BDPCM is not applied to the current block. As described above, since the encoder does not transmit redundant information and the decoder does not parse the redundant information, encoding/decoding efficiency may be increased. Since the encoder does not generate transform_skip_flag, encoding efficiency may be increased and a bitstream capacity may be reduced. In addition, the decoder may increase computing efficiency by inferring information without a parsing process.

The transform skip information transform_skip_flag may be parsed for each chroma component and each luma component. The chroma components may include Cb and Cr. The transform skip information transform_skip_flag may be parsed for each Cb and each Cr. The transform skip information transform_skip_flag may be parsed for the luma component regardless of the chroma component. The transform skip information transform_skip_flag may be parsed for the chroma component regardless of the luma component. The device for processing the video signal may obtain the transform skip information transform_skip_flag for the luma component and obtain the transform skip information transform_skip_flag for the chroma component. In addition, when the transform skip information transform_skip_flag is absent, the transform skip information transform_skip_flag may be inferred for each chroma component and each luma component. The device for processing the video signal may infer the transform skip information transform_skip_flag using the method as already described. Alternatively, the device for processing the video signal may infer the transform skip information transform_skip_flag for the chroma component by using the transform skip information transform_skip_flag for the luma component.

Figure 14:
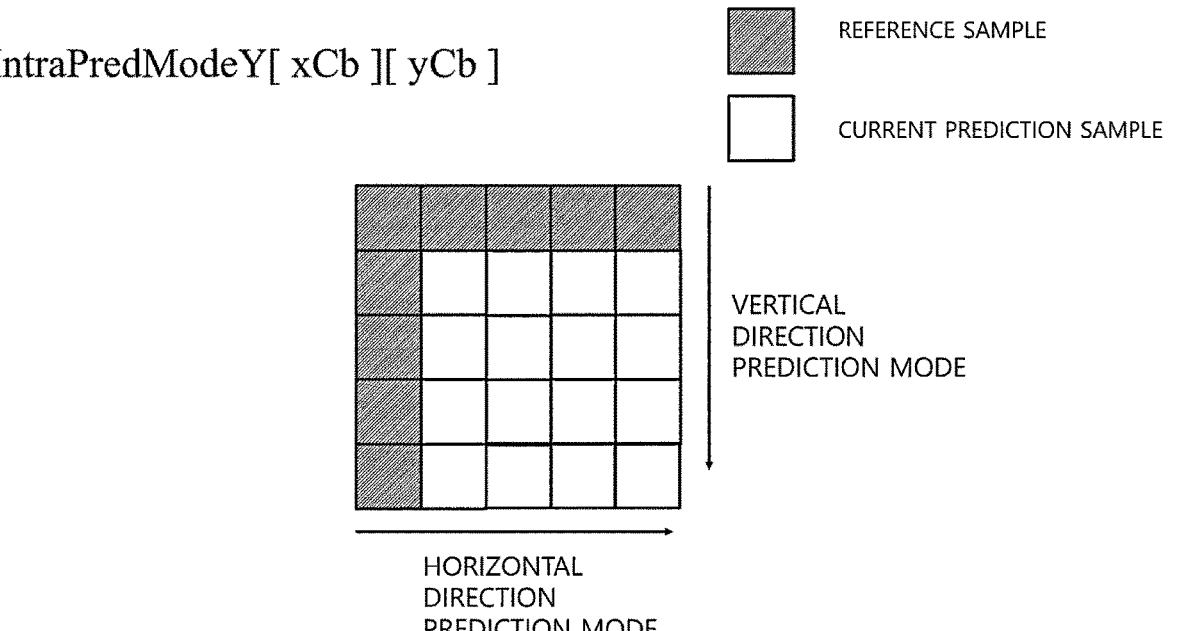
FIG. 14 is a diagram illustrating a relationship between a block to which BDPCM is applied and an intra prediction mode variable.

FIG. 14 is a diagram illustrating a relationship between a block to which the BDPCM is applied and an intra prediction mode variable.

For the block to which the BDPCM is applied, the intraprediction mode may be indicated by the value of intra_bdpcm_dir_flag[x0][y0]. For example, when the intra BDPCM direction information intra_bdpcm_dir_flag is 0, the device for processing the video signal may perform a step of selecting the intra prediction mode (mode number 18) corresponding to the horizontal direction among the plurality of intra modes as the intra prediction mode of the current block. In addition, when intra BDPCM direction information intra_bdpcm_dir_flag is 1, the device for processing the video signal may perform a step of selecting the intra prediction mode (mode number 50) corresponding to the vertical direction among the plurality of intra modes as the intra prediction mode of the current block.

The intra prediction mode used in the block to which the BDPCM is applied is the same as a general intra prediction mode, and thus the corresponding mode may be stored as a variable IntraPredModeY[xCb][yCb], which indicates the intra prediction mode of the current prediction block, and used when the MPM of a general coding block is derived. That is, the intra prediction mode of the current block may be used to determine the intra prediction mode of a neighboring block to be reconstructed after the current block. In addition, the device for processing the video signal may store the intra prediction mode of the current block as a candidate for determining the intra prediction mode of the neighboring block to be reconstructed after the current block. The device for processing the video signal may determine the intra prediction mode of the neighboring block to be reconstructed after the current block by selecting one of a plurality of stored candidates based on parsed information.

In addition, the intra prediction mode of the already reconstructed coding block may be used to determine the intra prediction mode of the current block. The device for processing the video signal may store the intra prediction mode of the already reconstructed coding block as a candidate for determining the intra prediction mode of the current block. The device for processing the video signal may determine the intra prediction mode of the current block by selecting one of the plurality of stored candidates based on the parsed information.

For example, if the current block is a general that is not a block to which the BDPCM is applied, one of the already reconstructed neighboring blocks is the block to which the BDPCM is applied, and intra_bdpcm_dir_flag[x0][y0] is 0, the intra prediction mode number 18 may be stored in IntraPredModeY[xCb][yCb]. In order to encode or decode the general coding block, the device for processing the video signal may use the intra prediction mode number 18 of the already reconstructed neighboring block. More specifically, the device for processing the video signal may use the intra prediction mode number 18 of the already reconstructed neighboring block when the MPM is derived for the current block. Since the purpose of the prediction mode of the block to which the BDPCM is applied is to minimize the final residual signals, the prediction method may be the same, but a preset value may be used because the pattern of the residual signals may be different from the general situation. DC mode may be set as one mode in the vertical direction to the horizontal direction mode of BDPCM, as one mode in the horizontal direction to the vertical mode of BDPCM, or as one mode in both directions of BDPCM.

Although the above descriptive contents have been described from the viewpoint of the decoder, the same may be applied to the encoder as well. In the above descriptive contents, the term parsing has been mainly described for the process of obtaining information from the bit stream, but from the perspective of the encoder, parsing may be interpreted as composing the corresponding information in the bit stream. Therefore, the term parsing is not limited to a decoder operation, and the term parsing may be interpreted as an act of composing a bit stream in terms of the encoder.

The above-described embodiments of the present invention can be implemented through various means. For example, embodiments of the present invention may be implemented by hardware, firmware, software, or a combination thereof.

For implementation by hardware, the method according to embodiments of the present invention may be implemented by one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, and the like.

In the case of implementation by firmware or software, the method according to embodiments of the present invention may be implemented in the form of a module, procedure, or function that performs the functions or operations described above. The software code can be stored in memory and driven by a processor. The memory may be located inside or outside the processor, and may exchange data with the processor by various means already known.

The above-mentioned description of the present invention is for illustrative purposes only, and it will be understood that those of ordinary skill in the art to which the present invention belongs may make changes to the present invention without altering the technical ideas or essential characteristics of the present invention and the invention may be easily modified in other specific forms. Therefore, the embodiments described above are illustrative and are not restricted in all aspects. For example, each component described as a single entity may be distributed and implemented, and likewise, components described as being distributed may also be implemented in an associated fashion.

The scope of the present invention is defined by the appended claims rather than the above detailed description, and all changes or modifications derived from the meaning and range of the appended claims and equivalents thereof are to be interpreted as being included within the scope of present invention.

What is claimed is:

1. A device for decoding a video signal, the device comprising:
a processor,
wherein the processor is configured to:
when a condition is satisfied, obtain intra block-based delta pulse code modulation (BDPCM) information indicating whether a BDPCM is applied to a current block,
when the intra BDPCM information indicates that the BDPCM is applied to the current block:
skip obtaining transform skip information indicating whether a transform is applied to a transform block corresponding to the current block, and infer a value of the transform skip information as a value indicating that the transform is not applied to the transform block,
obtain intra BDPCM direction information indicating a prediction direction of the BDPCM applied to the current block,
reconstruct the current block based on the intra BDPCM direction information, and
wherein the intra BDPCM information and the intra BDPCM direction information are obtained for a luma component regardless of a chroma component.

2. The device of claim 1,
wherein the condition includes a case that a width of a current block is less than or equal to a first value, and a height of the current block is less than or equal to a second value, wherein the first value and the second value are related to a maximum block size that allows transform skip.

3. The device of claim 1,
wherein the processor is configured to:
obtain BDPCM enable information indicating whether the BDPCM is enabled,
wherein the condition includes a case that the BDPCM enable information indicates that the BDPCM is enabled.

4. The device of claim 3, wherein the BDPCM enable information is signaled in a sequence parameter set.

5. The device of claim 1, wherein the intra BDPCM direction information indicates one of a horizontal direction or a vertical direction.

6. The device of claim 5,
when the intra BDPCM direction information indicates the horizontal direction, an intra prediction mode of the current block is an intra prediction mode corresponding to the horizontal direction, and
when the intra BDPCM direction information indicates the vertical direction, the intra prediction mode of the current block is an intra prediction mode corresponding to the vertical direction.

7. The device of claim 6,
wherein when a value of the intra BDPCM direction information is 0, the intra BDPCM direction information indicates the horizontal direction,
wherein when the value of the intra BDPCM direction information is 1, the intra BDPCM direction information indicates the vertical direction.

8. The device of claim 7, wherein the intra prediction mode of the current block is included in intra prediction mode candidates for signaling an intra prediction mode of a neighboring block to be reconstructed after the current block.

9. A device for encoding video signal, the device comprising:
a processor,
wherein the processor is configured to:
obtain a bitstream to be decoded by a decoder using a decoding method, the decoding method comprising:
when a condition is satisfied, obtaining intra block-based delta pulse code modulation (BDPCM) information indicating whether a BDPCM is applied to a current block;
when the intra BDPCM information indicates that the BDPCM is applied to the current block:
skipping obtaining transform skip information indicating whether a transform is applied to a transform block corresponding to the current block, and inferring a value of the transform skip information as a value indicating that the transform is not applied to the transform block;
obtaining intra BDPCM direction information indicating a prediction direction of the BDPCM applied to the current block; and
reconstructing the current block based on the intra BDPCM direction information,
wherein the intra BDPCM information and the intra BDPCM direction information are obtained for a luma component regardless of a chroma component.

10. The device of claim 9,
wherein the condition includes a case that a width of a current block is less than or equal to a first value, and a height of the current block is less than or equal to a second value, wherein the first value and the second value are related to a maximum block size that allows transform skip.

11. The device of claim 9, the decoding method further comprising:

obtaining BDPCM enable information indicating whether the BDPCM is enabled, wherein the condition includes a case that the BDPCM enable information indicates that the BDPCM is enabled.

12. The device of claim 11, wherein the BDPCM enable information is signaled in a sequence parameter set.

13. The device of claim 9, wherein the intra BDPCM direction information indicates one of a horizontal direction or a vertical direction.

14. The device of claim 13, when the intra BDPCM direction information indicates the horizontal direction, an intra prediction mode of the current block is an intra prediction mode corresponding to the horizontal direction, and when the intra BDPCM direction information indicates the vertical direction, the intra prediction mode of the current block is an intra prediction mode corresponding to the vertical direction.

15. The device of claim 14, wherein when a value of the intra BDPCM direction information is 0, the intra BDPCM direction information indicates the horizontal direction, wherein when the value of the intra BDPCM direction information is 1, the intra BDPCM direction information indicates the vertical direction.

16. The device of claim 15, wherein the intra prediction mode of the current block is included in intra prediction mode candidates for signaling an intra prediction mode of a neighboring block to be reconstructed after the current block.

17. A method for obtaining a bitstream, method comprising:

when a condition is satisfied, obtaining intra block-based delta pulse code modulation (BDPCM) information indicating whether a BDPCM is applied to a current block;

when the intra BDPCM information indicates that the BDPCM is applied to the current block:

skipping obtaining transform skip information indicating whether a transform is applied to a transform block corresponding to the current block, and inferring a value of the transform skip information as a value indicating that the transform is not applied to the transform block;

obtaining intra BDPCM direction information indicating a prediction direction of the BDPCM applied to the current block, wherein the intra BDPCM information and the intra BDPCM direction information are obtained for a luma component regardless of a chroma component; and obtaining the bitstream including information for reconstructing the current block.

18. A method for decoding a video signal, the method comprising:

when a condition is satisfied, obtaining intra block-based delta pulse code modulation (BDPCM) information indicating whether a BDPCM is applied to a current block;

when the intra BDPCM information indicates that the BDPCM is applied to the current block:

skipping obtaining transform skip information indicating whether a transform is applied to a transform block corresponding to the current block, and inferring a value of the transform skip information as a value indicating that the transform is not applied to the transform block;

obtaining intra BDPCM direction information indicating a prediction direction of the BDPCM applied to the current block; and reconstructing the current block based on the intra BDPCM direction information, wherein the intra BDPCM information and the intra BDPCM direction information are obtained for a luma component regardless of a chroma component.

\* \* \* \* \*